(12) United States Patent
Li et al.

(10) Patent No.: US 11,211,061 B2
(45) Date of Patent: Dec. 28, 2021

(54) VOICE CONTROL IN A MULTI-TALKER AND MULTIMEDIA ENVIRONMENT

(71) Applicant: 2236008 Ontario Inc., Waterloo (CA)

(72) Inventors: Xueman Li, Burnaby (CA); Mark Robert Every, Surrey (CA); Darrin Kenneth John Fry, Kanata (CA)

(73) Assignee: 2236008 Ontario Inc., Waterloo (CA)

(*) Notice: Subject to any disclaimer, the term of this patent is extended or adjusted under 35 U.S.C. 154(b) by 200 days.

(21) Appl. No.: 16/241,327

(22) Filed: Jan. 7, 2019

(65) Prior Publication Data

US 2020/0219493 A1    Jul. 9, 2020

(51) Int. Cl.

| | |
|---|---|
| *G10L 15/20* | (2006.01) |
| *G10L 15/18* | (2013.01) |
| *G10L 15/22* | (2006.01) |
| *G10L 21/0232* | (2013.01) |
| *G10L 25/84* | (2013.01) |
| *H04R 1/40* | (2006.01) |
| *H04R 3/00* | (2006.01) |
| *G10L 15/08* | (2006.01) |
| *G10L 21/0208* | (2013.01) |

(52) U.S. Cl.
CPC ......... *G10L 15/20* (2013.01); *G10L 15/1815* (2013.01); *G10L 15/22* (2013.01); *G10L 21/0232* (2013.01); *G10L 25/84* (2013.01); *H04R 1/406* (2013.01); *H04R 3/005* (2013.01); *G10L 2015/088* (2013.01); *G10L 2015/223* (2013.01); *G10L 2021/02082* (2013.01)

(58) Field of Classification Search
CPC ..... G10L 15/20; G10L 15/1815; G10L 15/22; G10L 21/0232; G10L 25/84; G10L 2015/088; G10L 2015/223; G10L 2021/02082; H04R 1/406; H04R 3/005
See application file for complete search history.

(56) References Cited

U.S. PATENT DOCUMENTS 7,831,035 B2 * 11/2010 Stokes ................. H04M 9/082
                                                              379/406.01
8,175,871 B2    5/2012 Wang et al.
(Continued)

FOREIGN PATENT DOCUMENTS

| EP | 3346466 | 7/2018 |
| WO | 2016085776 | 6/2016 |
| WO | 20170138934 | 8/2017 |

OTHER PUBLICATIONS

Office Action; U.S. Appl. No. 15/835,215 dated Dec. 17, 2019.
(Continued)

*Primary Examiner* — Michelle M Koeth
(74) *Attorney, Agent, or Firm* — Ridout and Maybee LLP

(57) ABSTRACT

Voice control in a multi-talker and multimedia environment is disclosed. In one aspect, there is provided a method comprising: receiving a microphone signal for each zone in a plurality of zones of an acoustic environment; generating a processed microphone signal for each zone in the plurality of zones of the acoustic environment, the generating including removing echo caused by audio transducers in the acoustic environment from each of the microphone signals, and removing interference from each of the microphone signals; and performing speech recognition on the processed microphone signals.

14 Claims, 11 Drawing Sheets

(56) References Cited

U.S. PATENT DOCUMENTS

| | | | |
|---|---|---|---|
| 9,111,326 | B1 | 8/2015 | Worley et al. |
| 9,818,407 | B1* | 11/2017 | Secker-Walker ....... G10L 15/32 |
| 2002/0049596 | A1 | 4/2002 | Burchard et al. |
| 2005/0265560 | A1 | 12/2005 | Haulick et al. |
| 2007/0110254 | A1 | 5/2007 | Christoph |
| 2010/0020984 | A1 | 1/2010 | Janse et al. |
| 2011/0093273 | A1 | 4/2011 | Lee et al. |
| 2012/0197637 | A1 | 8/2012 | Gratke et al. |
| 2014/0301558 | A1 | 10/2014 | Fan |
| 2015/0194151 | A1* | 7/2015 | Jeyachandran ......... G10L 15/20 704/233 |
| 2015/0206529 | A1 | 7/2015 | Kwon et al. |
| 2018/0108351 | A1 | 4/2018 | Beckhardt et al. |
| 2018/0190282 | A1* | 7/2018 | Mohammad ............ G10L 25/84 |
| 2019/0066680 | A1* | 2/2019 | Woo ........................ G10L 15/08 |
| 2019/0073999 | A1* | 3/2019 | Premont ................. G10L 15/08 |
| 2021/0118439 | A1* | 4/2021 | Schillmoeller ..... G06F 3/04842 |

OTHER PUBLICATIONS

Advisory Action; U.S. Appl. No. 15/835,215 dated Oct. 31, 2019.
Extended European Search Report; EP 19219978.4 dated Apr. 22, 2020.
Summons to attend oral proceedings pursuant to Rule 115(1) EPC; EP 18150255.0 Feb. 24, 2020.
Multichannel Speech Separation by Eigendecomposition and it's Application to Co-Talker Interference Removal; Cao at al. May 3, 1997.
Summons to attend Oral Proceedings Pursuant to Rule 115(1) EPC; EP18150266.7 Mar. 2, 2020.
Final Rejection; U.S. Appl. No. 15/835,215 dated May 29, 2020.
Communication Pursuant to Article 94(3); EP 18150255.0 dated Aug. 1, 2019.
Communication Pursuant to Article 94(3); EP 18150266.7 dated Aug. 1, 2019.
Final Rejection; U.S. Appl. No. 15/835,215 dated Aug. 8, 2019.
European Search Report corresponding to EP 18150266.7 dated Mar. 16, 2018.
Schmidt, Gerald et al., "Signal processing for in-car communication systems", Signal Processing, Elsevier Science Publishers B.B. Amsterdam, NL, vol. 86, No. 6, Jun. 1, 2006, pp. 1307-1326. Jun. 1, 2006.
Toon Van Waterschoot et al., Fifty Years of Acoustic Feedback Control: State fo the Art and Future Challenges, Proceedings of the IEEE., vol. 99, No. 2, Feb. 1, 2011, pp. 288-327. Feb. 1, 2011.
Withopf Jochen et al., "Estimation of Time-Variant Acoustic Feedback Paths in In-Car communications Systems", 2014 14th International Workshop on Acoustic Signal Enhancement (IWAENC), IEEE, Sep. 2014, pp. 104-108. Sep. 2014.
Extended European Search Report; dated May 7, 2018; 18150255.0 dated May 7, 2018.
Office Action; U.S. Appl. No. 15/835,215 dated Apr. 4, 2019.
Office Action; U.S. Appl. No. 15/835,187 dated Mar. 26, 2019.
J. Benesty, D.R. Morgan, and M.M. Sondhi, "A better understanding and an improved solution to the specific problems of stereophonic acoustic echo cancellation," IEEE Transactions on Speech and Audio Processing, vol. 6, No. 2, pp. 156-165 1998.
L. Romoli, S. Cecchi, and F. Piazza, "A combined approach for channel decorrelation in stereo acoustic echo cancellation exploiting time-varying frequency shifting," IEEE Signal Pro-cessing Letters, vol. 20, No. 7, pp. 717-720 2013.
Final Rejection; U.S. Appl. No. 15/835,187 dated Jun. 26, 2019.
Architecture Guide, QNX CAR Platform for Infotainment 2.1, QNX Software Systems Limited, 62 pages 2014.
Office Action; U.S. Appl. No. 15/835,215 dated Apr. 5, 2021.

* cited by examiner

VOICE CONTROL IN A MULTI-TALKER AND MULTIMEDIA ENVIRONMENT

TECHNICAL FIELD

This disclosure relates to audio signal processing, and in particular, to systems and methods of voice control in a multi-talker and multimedia environment.

BACKGROUND

A vehicle may provide an entertainment space and may be highly personalized. A vehicular multimedia system may comprise multiple screens and may be used to not only listen to music but possibly also to watch TV, movies, play games, either collectively or individually. At the same time, a vehicle may comprise an automatic speech recognition and natural language processing engine/system. One or more multimedia sources and users interacting with one another or with a multimedia system may interfere with the speech commands. For at least these reasons, systems and methods of voice control in a multi-talker and multimedia environment is desirable.

DETAILED DESCRIPTION

Figure 1:
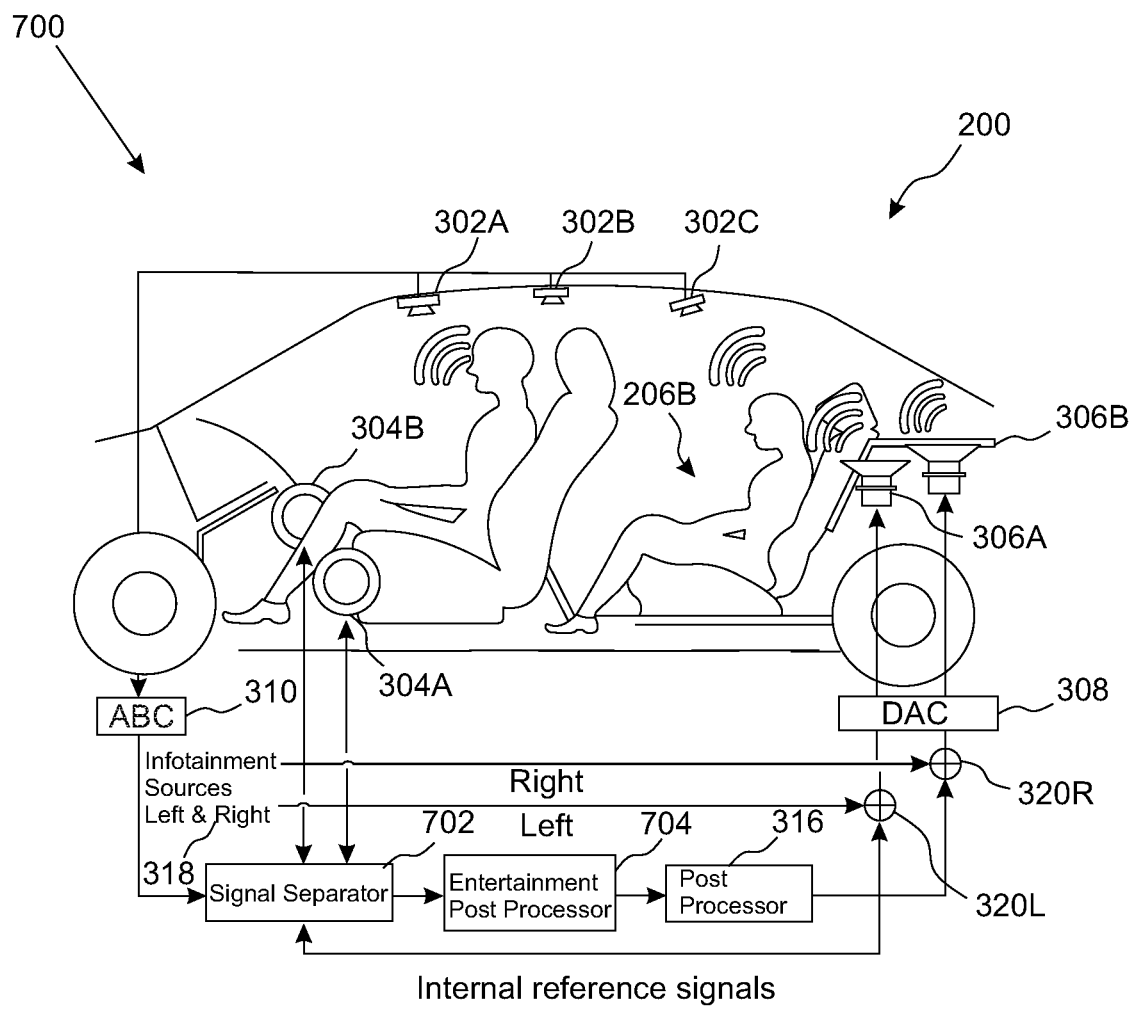
FIG. 1 is a side schematic view of a speech recognition system executing a multi-zone cancellation.

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete. Wherever possible, the same reference numbers are used in the drawings and the following description to refer to the same elements, and prime notation is used to indicate similar elements, operations or steps in alternative embodiments. Separate boxes or illustrated separation of functional elements of illustrated systems and devices does not necessarily require physical separation of such functions, as communication between such elements may occur by way of messaging, function calls, shared memory space, and so on, without any such physical separation. As such, functions need not be implemented in physically or logically separated platforms, although they are illustrated separately for ease of explanation herein. Different devices may have different designs, such that although some devices implement some functions in fixed function hardware, other devices may implement such functions in a programmable processor with code obtained from a machine-readable medium. Lastly, elements referred to in the singular may be plural and vice versa, except where indicated otherwise either explicitly or inherently by context.

The present disclosure provides systems and methods of voice control in a multi-talker and multimedia environment, and in particular, multi-zone speech recognition systems with interference and echo cancellation and related methods which may be used in a vehicle or other suitable environment. The systems and methods seek to address interference of vehicular multimedia sources and multiple talkers with an automatic speech recognition engine/system. The systems and methods seek to determine a location (i.e., zone) of various emitting sources (i.e., talkers) in a vehicle cabin and acoustically process/treat each transmitted signal (i.e., speech command) from each location (i.e., zone) to facilitate the correct processing of speech commands by the automatic speech recognition engine/system.

The systems and methods of the present disclosure also allow each user's voice to be captured and processed so as to be substantially free of echo and interference from other sound sources in the vehicle such as concurrent speech, media and noise, as well as methods that identify from which zone (e.g., seat) a speech command is issued. The methods may be applied to hands-free calling as well as speech recognition, and may be applied outside of automotive context, for example, when handling communications with a smart speaker, smart display, or similar device, or in a video conferencing system.

In accordance with one aspect of the present disclosure, there is provided a method of voice control in a multi-talker and multimedia environment, comprising: receiving a plurality of microphone signals for each zone in a plurality of zones of an acoustic environment; generating a processed microphone signal for each zone in the plurality of zones of the acoustic environment, the generating including removing (e.g., subtracting or suppressing) echo caused by audio transducers in the acoustic environment from each of the microphone signals, and removing (e.g., subtracting or suppressing) interference from each of the microphone signals; and performing speech recognition on the processed microphone signals.

In some embodiments, the method further comprises: performing keyword spotting on the processed microphone signal for each zone in the plurality of zones of the acoustic environment; and in response to detection of a wake word in the processed microphone signal of a zone of a first occupant in the plurality of zones of the acoustic environment, initiating an automatic speech recognition session for the zone of the first occupant.

In some embodiments, the method further comprises: in response to detection of the wake word in the processed microphone signal of a zone of a first occupant in the plurality of zones of the acoustic environment, setting an audio channel of the zone of the first occupant for the automatic speech recognition session.

In some embodiments, the method further comprises: during the automatic speech recognition session, speech recognition is performed on the audio channel of the zone of the first occupant only.

In some embodiments, the method further comprises: in response to detection of the wake word in the processed microphone signal of the zone of the first occupant, setting the zone of the first occupant as an active zone. In some embodiments, the method further comprises: in response to detection of the wake word in the processed microphone signal of the zone of the first occupant, setting an audio channel of the active zone as an active audio channel for the automatic speech recognition session.

In some embodiments, during the automatic speech recognition session echo caused by audio transducers in the acoustic environment from each of the microphone signals is removed from the active audio channel and interference from the microphone signals of other audio channels is removed from the audio channel.

In some embodiments, the method further comprises: during the automatic speech recognition session, speech recognition is performed on the audio channel of the zone of the first occupant only.

In some embodiments, the method further comprises: during the automatic speech recognition session, performing natural language processing on results of the speech recognition to determine an action to be performed.

In some embodiments, the method further comprises: during the automatic speech recognition session, performing the determined action.

In some embodiments, both the active zone and the results of speech recognition are used to determine an action to be performed.

In some embodiments, the method further comprises: during the automatic speech recognition session, providing an audio indication of the active zone.

In some embodiments, the audio indication comprises decreasing a volume of audio output from one or more speakers in the active zone.

In some embodiments, the audio indication comprises outputting a speech prompt or sound from one or more speakers in the active zone.

In some embodiments, the method further comprises: in response to detection of a sleep word in the processed microphone signal of the zone of the first occupant, terminating the automatic speech recognition session for the zone of the first occupant.

In some embodiments, removing interference from each of the microphone signals comprises removing interference speech from speech originating in other zones.

In some embodiments, removing interference speech caused by speech originating in other zones comprises: applying an adaptive filter to each microphone signal to detect speech of an occupant of a respective zone; for each zone in which speech of an occupant is detected, estimating a speech contribution of the occupant on the microphone signals in other zones; for each microphone signal, removing the estimated speech contribution of occupants in other zones.

In some embodiments, removing echo caused by audio transducers in the acoustic environment from each of the microphone signals comprises: estimating a plurality of echo paths from each of the plurality of audio transducers to each of the plurality of microphones in the acoustic environment, each microphone being located in and associated with a zone in the plurality of zones of the acoustic environment; and removing echo contributions from each of the plurality of echo paths from the microphone signals.

In some embodiments, the echo contributions are estimated via impulse responses from each of a plurality of speakers in the acoustic environment to each of the plurality of microphones in the acoustic environment and reference signals.

In some embodiments, generating the processed microphone signal for each zone in the plurality of zones of the acoustic environment further includes: removing feedback caused by audio transducers in the acoustic environment from each of the microphone signals.

In some embodiments, generating the processed microphone signal for each zone in the plurality of zones of the acoustic environment further includes: performing noise reduction on each of the microphone signals.

In some embodiments, generating the processed microphone signal for each zone in the plurality of zones of the acoustic environment further includes: applying one or more of equalization or adaptive gain to each of the microphone signals.

In some embodiments, a plurality of microphone signals are received in each zone, wherein generating the processed microphone signal for each zone in the plurality of zones of the acoustic environment comprises combining the microphone signals of each zone into a composite signal using fixed mixing, dynamic mixing, or beamforming.

In some embodiments, the method further comprises: performing keyword spotting on a composite of the processed microphone signal for each zone in the plurality of zones of the acoustic environment; and in response to detection of a wake word in the composite of the processed microphone signal, determining a zone which was most active when the wake word was detected is determined to be an active zone, and initiating an automatic speech recognition session for the active zone.

In some embodiments, the method further comprises: in response to detection of a wake word in the composite of the processed microphone signal, setting an audio channel of the active zone as the active audio channel for the automatic speech recognition session.

In some embodiments, the method further comprises: playing processed microphone signals through audio transducers in the vehicle to provide a vocal reinforcement or in-car communications system to facilitate communication between occupants of the vehicle.

In accordance with another aspect of the present disclosure, there is provided a method that cancels multi-zone interference in a vehicle comprising: capturing one or more composite microphone signals containing signals associated with a desired talker; capturing one or more undesired microphone signals containing signals associated with one or more undesired talkers; decomposing the undesired microphone signals by associating one or more adaptive filters with each of the one or more undesired talkers and convolving each of the one or more adaptive filters with each of the one or more undesired microphone signals sourced by one of the undesired talkers to render separate models for each of the one or more undesired talkers; estimating the one or more undesired microphone signals for each of the one or more undesired talkers based on the decomposition; and processing the one or more composite microphone signals in response to the estimated one or more undesired microphone signals by subtracting the estimates of the one or more undesired microphone signals of each of the one or more undesired talkers from the composite microphone signals to render a desired talker signal.

In some embodiments, the undesired microphone signals comprise speech.

In some embodiments, the desired talker signal is identified by detecting the microphone signal having an intensity greater than a predetermined threshold above a level of the undesired microphone signals.

In some embodiments, the one or more undesired microphone signals comprise delayed portions of the desired talker signal.

In some embodiments, the one or more undesired microphone signals comprise attenuated portions of the desired talker signal.

In some embodiments, the desired talker signal comprises a plurality of signals identified by measuring a coherence.

In accordance with a further aspect of the present disclosure, there is provided a method that enhances voice comprising: capturing one or more microphone signals containing echo from signals reproduced by one or more transducers; estimating a plurality of echo paths from each of the one or more microphones; and processing the captured one or more microphone signals in response to the estimated plurality of echo paths by subtracting the echo contributions of each of the plurality of echo paths from the captured one or more microphone signals.

In some embodiments, the plurality of echo paths are linearly independent.

In some embodiments, the subtracting of the echo contributions of echo paths is executed by a plurality of echo canceller instances that executes a plurality of adaption rules that differ between each of the plurality of echo paths.

In some embodiments, the method further comprises converting the captured one or more microphone signals into the frequency domain.

In some embodiments, the conversion into the frequency domain occurs through a filter bank.

In accordance with yet further aspects of the present disclosure, there is a provided a system having a processor and a memory coupled to the processor, the memory having tangibly stored thereon executable instructions for execution by the processor, wherein the executable instructions, when executed by the processor, cause the system to perform the methods described herein.

In accordance with yet further aspects of the present disclosure, there is provided a non-transitory machine readable medium having tangibly stored thereon executable instructions for execution by a processor, wherein the executable instructions, when executed by the processor, cause the computer to perform the methods described herein.

FIG. 1 is a side schematic view of the vehicle of a speech recognition system 700 executing multi-zone interference cancellation. In the multi-zone interference cancellation, microphones are positioned near each occupant whose voice is of interest. For example, in a vehicle with three occupants, such as the vehicle 200 shown in FIG. 1, (a driver, a co-driver that is hidden, and a single rear-seat passenger) there will be three or more microphones 302 A through C placed such that each of the microphones 302 A through C ideally capture only a single and different talker. In vehicles with four occupants, there are four or more microphones (e.g., the number of microphones will be equal or be greater than the number of talkers) or in the alternative, may be less when the systems use one or more beamforming microphone arrays that steer the pickup patterns of each of the talking occupants, and in some instances, further reject unwanted noise and echo. In some systems, the microphones reject all of the undesired talkers. In other systems, microphones such as microphones 302 A through C of FIG. 1, capture sound from some of the undesired talkers. In FIG. 1, a multi-zone interference cancellation uses a signal separator processor 702 made up of adaptive filters to model the talker-to-microphone impulse responses that estimate the undesired talker's signals and render signals that subtract the voices of the undesired talkers from the microphone signals to isolate the desired talker's utterances.

As an example, suppose that the desired signals to be preserved are sourced from the driver (referred to as the desired talker), and the undesired signals that are to be eliminated are sourced from the other occupants (referred to as the undesired talkers). In this use case, the interference signals are the microphone signals sourced from locations other than the driver (i.e., the co-driver and the left rear passenger). These interference signals are convolved with their own adaptive filters rendering separate models for each of the undesired talkers that together produce estimates of all of the undesired signals that are subtracted from the composite driver's microphone signal, which results in isolating the driver's signal or substantially isolating it. In this example the microphones are positioned such that the microphone or microphones positioned nearest a talker generate the loudest signal of that talker, thus providing a reference signal for identifying each of the talkers in a given composite signal. Because vehicle cabins are a confined space, and all the occupants share the same acoustic environment, the desired signal, the driver's voice in this example, may also be captured by the other microphones 302 B and C such that the reinforcement signals processed by the other adaptive filters are contaminated with a slightly attenuated and delayed version of the driver's voice. If these adaptive filters don't adapt properly, the system will subtract the estimated signals too aggressively and eliminate the desired signals; or in the alternative, be too permissive and allow too much of the undesired signals to pass through to the vehicle cabin. As a result, the speech recognition system of FIG. 1 executes controlled learning processes so that its adaptive filters model the talker-to-microphone or the microphone-to-microphone impulse responses. The adaptive filters model the microphone-to-microphone impulse response even when the desired and undesired components of the signals are nearly identical and occur simultaneously. When using adaptive filters, such as an adaptive filter from microphone 302A to microphone 302B, the adaptive filter 302A to 302B adapts whenever the signal on microphone 302A is louder (by a predetermined threshold) than the signal on microphone 302B (per a given frequency signal or frequency band), and if the signal on both microphones is above their respective estimated noise. The system need not figure out who may be talking or when they stopped talking. In this application, even when two zones contain speech or talking, both adaptive filters (e.g., adaptive filter 302A to 302B and adaptive filter 302B to 302A) can adapt because one adaptive filter may detect high amplitude signals in the low frequencies, while the other adaptive filter may detect high amplitude signals in the high frequencies. In addition, the adaptive filters may adapt only when the coherence between microphones exceeds a certain threshold. The coherence between two microphones may indicate a likelihood that the spectral content of the microphone signals originate from the same source or talker. Further, each undesired talker's signal may be differentiated from other signals in the vehicle 200 by convolving the desired talker's signal with its own adaptive filter rendering the desired talker's model. The desired talker's model and the previously rendered undesired talker models not associated with the undesired signals to be isolated produce estimates of the other undesired signals and the desired signals. The sum of these estimates are then subtracted from the composite undesired microphone signal associated with the undesired talker to be isolated (the composite signal having the loudest signal of that undesired talker), which isolates that undesired talker's signal or substantially isolates it.

In FIG. 1, an application post processor (or processor system) 704 receives processed microphone signals and other inputs from the vehicle 200 to provide information, infotainment, entertainment services and control services including but not limited to mapping, navigation, climate control, multimedia services, telephone, data and messaging services. The application post processor 704 comprises an automatic speech recognition (ASR) engine/system, which may be a structured language (e.g., grammar) based or a natural language processing (NLP) based ASR. Since the speech recognition system isolates speech and/or other content delivered in the vehicle 200 a parallel architecture through a tree-based ASR structure may execute speech recognition of a limited vocabulary size through one or more processing branches (or paths) when resources are limited or through an unlimited vocabulary through a NLP vocabulary that can include a dictionary in one or more or all processing branches or a combination of ASRs. The recognition results of the larger vocabulary ASRs and/or remote ASRs may be normalized with domain specific grammars in their respective processing branches. Word selections may occur based on a likelihood calculation, confidence level, or confidence score (referred to as a confidence score) that may be preserved in ASR metadata. When the highest likelihood or confidence score exceeds a predetermined or contextual threshold, an alignment system within the ASR may identify the spoken utterance and classify the spoken utterance as correctly recognized. The ASR results and the ASR metadata may be transmitted locally in the vehicle or transmitted from the vehicle to remote systems, devices, or applications.

The grammar-based or NLP-based ASR software engine that can comprise the digital application post processor 704 captures the speech signal by processing frames of speech input in real-time or after a programmed delay. An acoustic modeling, feature extraction, and normalization that match the sound parts of the input signal against the vocabularies are retained in a data store or memory. While the memory or data store may be a unitary part of a local grammar-based ASR engine, the data store may reside in a local or distributed memory, in a cloud, or a local or distributed database.

A vocabulary application program interface that is communicatively coupled to the digital application post processor 704 or is a unitary part of it, may provide access to all of the data needed to recognize speech. In some systems it may include one or more language models, acoustic models, word dictionaries, speaker profiles, etc. that may be accessed by the any of ASR engines through a vocabulary translator. A control application program interface coupled to the ASRs may provide the ASRs with access to speaker specific data, such as a speaker's address book or speaker's profile for example, and dynamic speaker specific data that may be translated into active grammars. A speech-to-text (STT) synthesis by an output translator coupled to the ASRs may translate the recognition output of the grammar-based or NLP-based ASR engines into text that may interface a local or remote short-message-service (SMS) system or application that transmits the text messages through an output interface of the digital post processing system 404 from the vehicle 200 through a local or remote wireless network to a remote wireless device.

Figure 2:
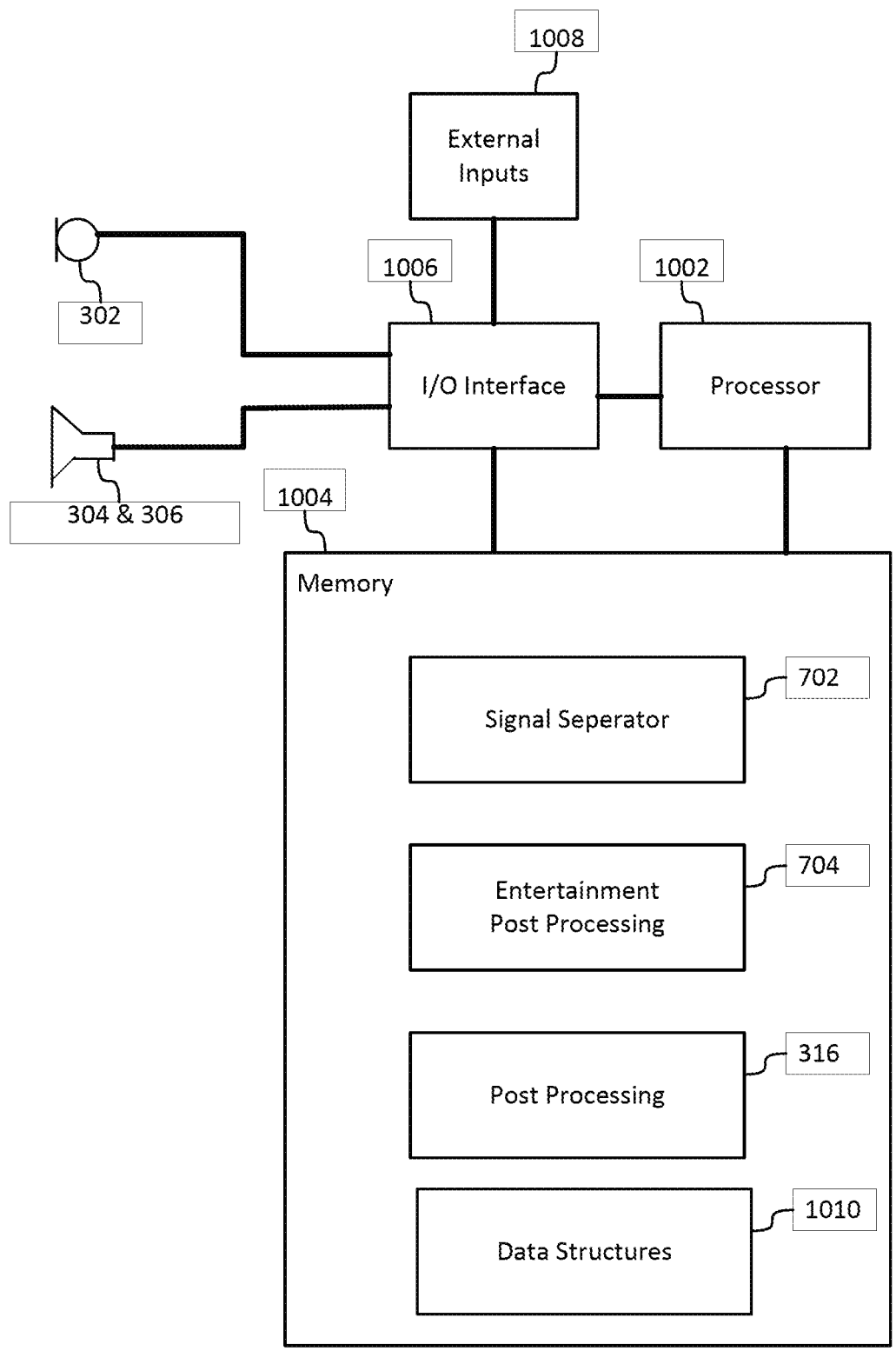
FIG. 2 is a block diagram of a speech recognition system executing a multi-zone cancellation.

FIG. 2 is a block diagram of a speech recognition system 1000 executing a multi-zone cancellation. The speech recognition system 1000 comprises a processor 1002, a non-transitory media such as a memory 1004 (the contents of which are accessible by the processor 1002) and an I/O interface 1006. The I/O interface 1006 may be used to connect devices such as, for example, additional microphones, audio transducers or loudspeakers, and receive external inputs 1008 from other local or remote sources. The memory 1004 may store instructions which when executed by the processor 1002 causes the system to render some or all of the functionality associated with signal isolation described herein. For example, the memory 1004 may store instructions which when executed by the processor 1002 causes the system to render the functionality associated with signal separation and isolation by the signal separator processor 702, application post processing by the application post processor 704, and the optional post processing by the post processor 316. In addition, data structures, temporary variables and other information may store data in memory 1004.

Voice Control in a Multi-talker and Multimedia Environment

The present disclosure provides systems and methods of voice control in a multi-talker and multimedia environment, and in particular, multi-zone speech recognition systems with interference and echo cancellation and related methods which may be used in a vehicle or other suitable environment. The systems and methods seek to address interference of vehicular multimedia sources and multiple talkers with an ASR engine/system. The systems and methods seek to determine a location (i.e., zone) of various emitting sources (i.e., talkers) in a vehicle cabin and acoustically process/treat each transmitted signal (i.e., speech command) from each location (i.e., zone) to facilitate the correct processing of speech commands by the ASR engine/system.

Conventional speech recognition systems used in vehicles typically focus on the driver being the source of interest and use a hands-free microphone associated with driver' seat as the audio input to the speech recognizer. Other sound sources in the vehicle, such as interference speech from other seats, road noise, wind noise, and media concurrently played via loudspeakers in the vehicle generally corrupt the microphone signal and, therefore, degrade the performance of speech recognition. A multi-zone vehicle-based SR system is advantageous for several reasons including, but not limited to, multi-user connectivity, autonomous driving, and MEMS (Micro-Electro-Mechanical Systems) microphones and digital audio transport layers. Multi-zone vehicle-based SR systems support multi-user connectivity. Consumer expectations are that more than one passenger, preferably all passengers, can connected to the vehicle and access cloud-based services using speech commands. Each passenger may wish to perform a different task, e.g. one person may be on a hands-free call, another person may be listening to music, and another person may be ordering something off an ecommerce site such as Amazon®. Multi-zone vehicle-based SR systems support autonomous driving solutions. Occupants of the vehicle may be seated in any seat, not necessarily the "driver's seat", i.e. there is no longer a preferred seat for driving. Multi-zone vehicle-based SR systems also support MEMS microphones and digital audio transport layers such as Automotive Audio Bus (A2B®) by ADI (Analog Devices, Inc.) or Ethernet AVB (Audio Video Bridging) allow multiple microphones to be integrated into the vehicle at a lower cost than having an analog wire from the head-unit to each and every microphone.

The systems and methods of the present disclosure also allow each user's voice to be captured and processed so as to be substantially free of echo and interference from other sound sources in the vehicle such as concurrent speech, media and noise, as well as methods that identify from which zone (e.g., seat) a speech command is issued. The methods may be applied to hands-free calling as well as speech recognition, and may be applied outside of automotive context, for example, when handling communications with a smart speaker, smart display, or similar device, or in a video conferencing system.

Example uses cases for the methods of the present disclosure will now be described. A first use case relates to initiating an ASR session. A person in a vehicle containing multiple occupants wishes to initiate an ASR session by uttering a keyword, such as "Hey Siri", "Alexa" or "Okay Google". Each occupant is in a separate zone of the cabin. The vehicle cabin contains one or more microphones which may or may not be dedicated for each zone. Each microphone picks up the voice of the occupant that wishes to initiate an ASR session as well as the voices of other occupants, known as "interference speech". The one or more microphone signals (or audio channels) are available to a wake word detector which determines not only whether/when a keyword was spoken but also from which zone the keyword was spoken. A number of problems scenarios may result in the inadequate behavior of the wake word detector. If there is no dedicated microphone per zone, or no means to identify the zone of the target talker, the speech command may not be detected, may be rejected or wrongly executed.

Figure 3:
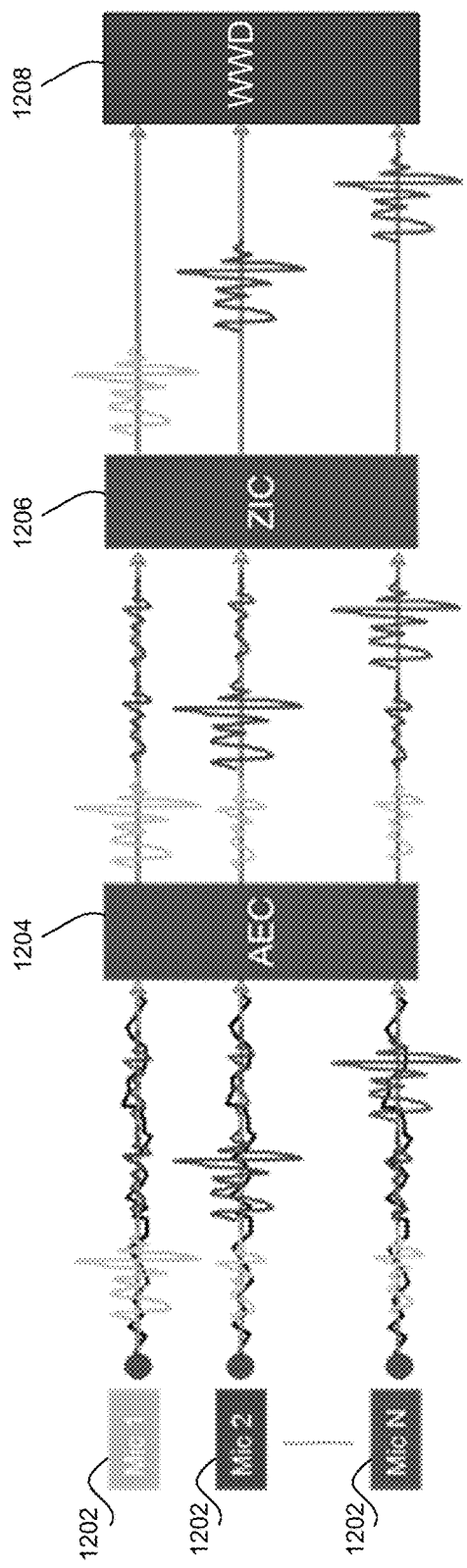
FIG. 3 is a block diagram illustrating audio processing in accordance with one example use case.

FIG. 3 is a block diagram illustrating audio processing in a vehicle in which each zone has a dedicated microphone 1202 in accordance with one embodiments of the present disclosure, where N is the number of microphones/zones in the vehicle. Each microphone signal contains speech of a target talker ("target speech), speech from other talkers ("interference speech") and echo, depicted in FIG. 3 as waveforms. Microphone signals are sent from each microphone 1202 to an AEC module 1204 that subtracts the echo from each microphone signal (the audio signal generated by the microphones 1202 in response to sound picked up by the microphone 1202). The output of the AEC module 1204 is received by a zone interference cancellation (ZIC) module 1206 that isolates the target speech from the interference speech in each microphone signal. The output of the ZIC module 1206 is sent to a wake word detector (WDD) module 1208. In the absence of ZIC module 1206, interference speech may cause the wake word detector module 1208 to fail to detect (or falsely reject) the keyword spoken by the target talker in the microphone signal from the target zone. In the absence of AEC module 1204, concurrent audio sources (e.g., media sources such as music, video, etc.) played in the vehicle may result in echo in the microphone signals, may cause the wake word detector module 1208 to fail to detect (or falsely reject) the keyword spoken by the target talker in the microphone signal from the target zone.

Lastly, in the absence of ZIC module 1206, interference of the target talker in microphones outside of the target zone may cause the wake word detector module 1208 to detect the keyword but from the wrong zone.

Figure 4:
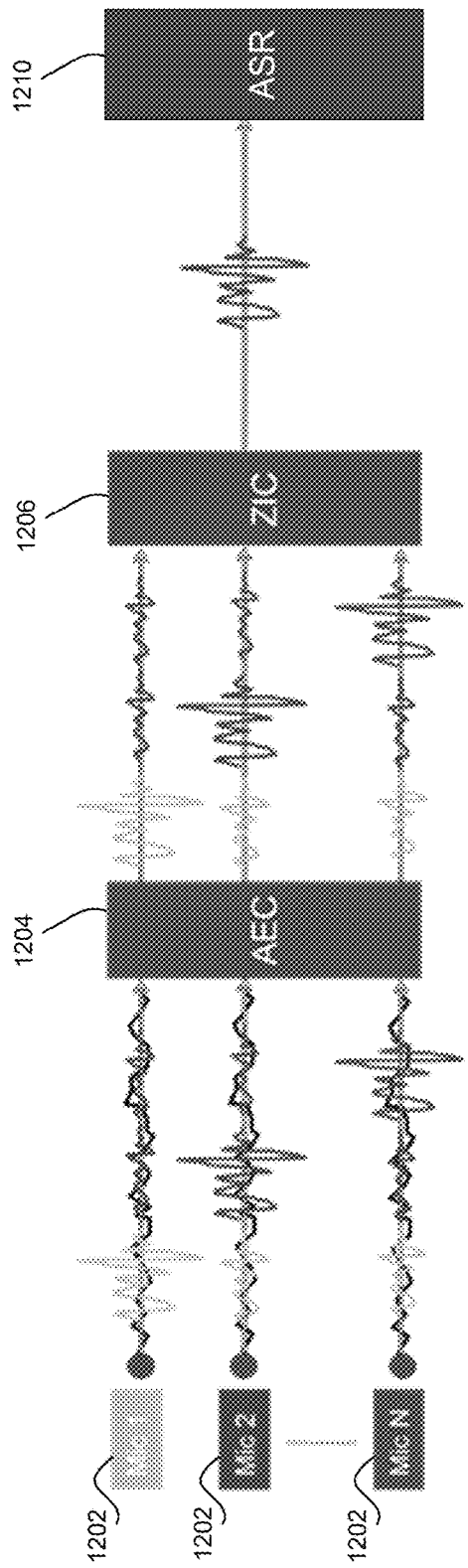
FIG. 4 is a block diagram illustrating audio processing in accordance with another example use case.

A second use case relates to interference during an ASR session. Once an ASR session has been initiated and the target zone has been identified (e.g., using wake word detector or push-to-talk), an occupant in the target zone uses speech commands to interact with an ASR engine/system 1210. The output of the ZIC module 1206 is sent to the ASR engine/system 1210. The target speech in the target zone may be mixed with interference speech from other zones and echo from audio sources (e.g., media sources such as music, video, etc.) playing into the vehicle cabin. These may result in incorrectly detected speech and difficulties in executing the speech command. FIG. 4 is a block diagram illustrating audio processing in a vehicle in which each zone has a dedicated microphone 1202, wherein zone 2 has been identified as the target zone.

Figure 5:
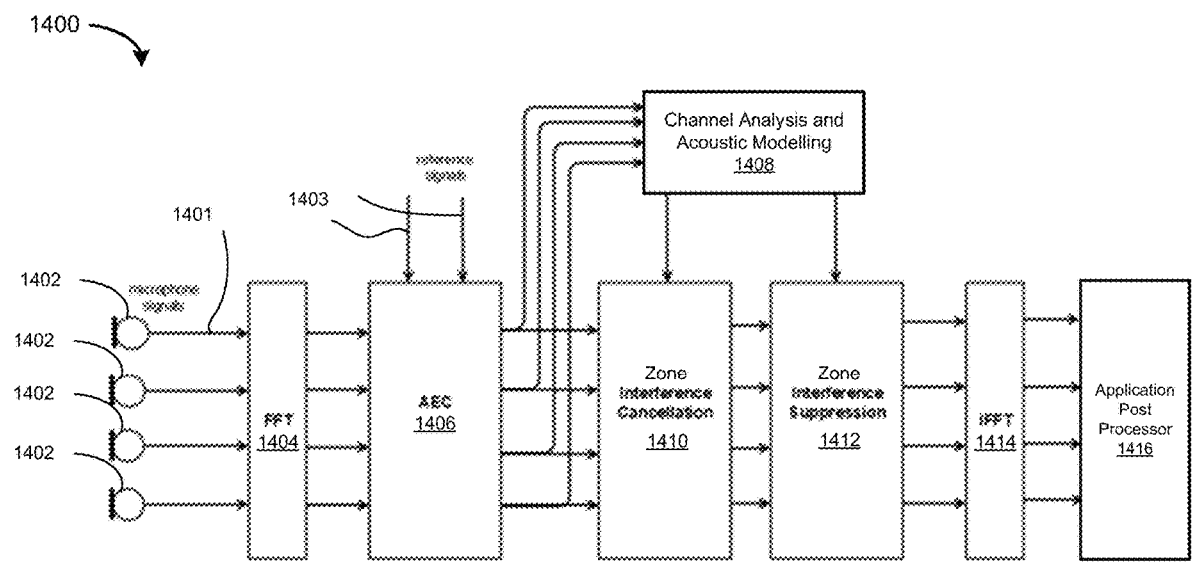
FIG. 5 is a block diagram of a speech recognition system providing multi-zone speech recognition with interference and echo cancellation system in accordance with one embodiment of the present disclosure.

FIG. 5 illustrates a multi-zone speech recognition front-end 1400 that provides multi-zone speech recognition system with interference and echo cancellation in accordance with one embodiment of the present disclosure. The system 1400 may be used in a vehicle or other suitable environment. The system 1400 is an audio front-end or user-facing audio system. The system 1400 can be used to remove interference and echo without degrading the target source quality, particularly when target source and interference source signals overlap over time. The system 1400 provides acoustic echo cancellation/suppression, zone interference cancellation/suppression, noise reduction, keyword spotting, and continuous speech recognition, as described below.

The system 1400 comprises a plurality of microphones 1402 which may be, for example, MEMS or electret microphones. One or more microphones 1402 are located in each zone. When more than one microphone 1402 is provided in a particular zone, the microphone signals from that particular zone are combined. The multiple microphone signals in a particular zone may be combined using simple averaging, dynamic mixing in frequency bands, fixed or adaptive beamforming or other techniques, such that one audio channel per zone is provided to further processing stages. Time domain audio signals 1401 are divided into overlapped frames, a window function is applied to each frame. The windowed signal is transformed into the frequency domain via a fast Fourier transform (FFT) module 1404, such as a Short-Time Fourier Transformation (STFT), or sub-band filtering. Once the signal is in the frequency domain, acoustic echo cancellation/suppression is applied by an AEC module 1406 to remove echo from audio playing from loudspeakers in the acoustic environment (e.g., vehicle cabin) such as music, radio or other background audio using references signals 1403. A channel analysis and acoustic modelling module 1408 analyzes the signal and noise level of each audio channel. The channel analysis and acoustic modelling module 1408 learns the acoustic interrelation between different audio channels for speech originating in each zone of the vehicle. For each audio channel, interference from undesired sources are cancelled through an interference cancellation process performed by a ZIC module 1410 followed by an interference suppression process performed by a zone interference suppression module 1412. An interference cancellation process 1410 subtracts estimated interference components from a corrupted audio channel, whereas a zone interference suppression module 1412 executes a non-linear attenuation of interference components. This non-linear attenuation may occur independently in different frequency bands, and the attenuation factor may be computed using for example, Wiener filtering or spectral subtraction. The resulting frequency domain signals are then transformed back into the time domain via inverse FFT module (IFFT) 1414 and overlap-add, or inverse sub-band filtering. The FFT module 1404, AEC module 1406, channel analysis and acoustic modelling module 1408, ZIC module 1410, zone interference suppression module 1412 and IFFT module 1414 may be processors.

For each channel, the channel analysis and acoustic modelling module 1408 calculates the power spectral density of the microphone signal. Background noise power is estimated using a suitable method, such as minimum statistics tracking or time-recursive averaging. At each frame, the channel which has the highest average Signal-to-Noise Ratio (SNR) at a certain frequency range is selected as the primary channel.

An acoustic model is used to measure the average magnitude ratio of a source signal in each zone between different microphones. An example algorithm is provided below in equation (1):

$$w_{j \to i}(k, n) = \frac{E(|x_i(k, n)|)}{E(|x_j(k, n)|)} \quad (1)$$

wherein $w_{j \to i}(k, n)$ is the average magnitude ratio between microphones i and j for a source signal in the zone containing microphone j. The estimates $w_{j \to i}(k,n)$ are calculated when microphone j is detected as the primary channel and the signal-to-noise ratios of microphone i and j both exceed a certain threshold at frequency bin k. $x_i(k, n)$ and $x_j(k, n)$ are the STFT of the microphone signal of the microphone i and j, k is the frequency bin, and n is the frame number.

Figure 6:
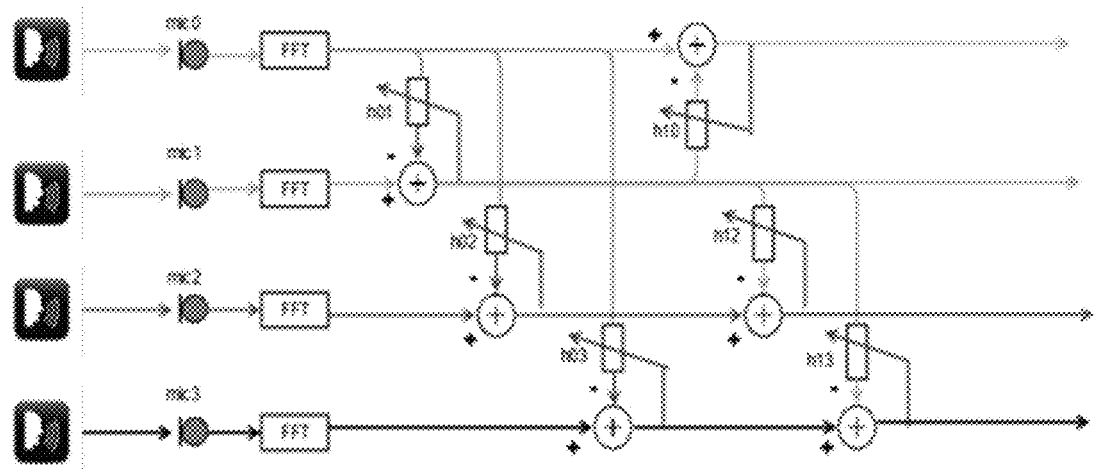
FIG. 6 is a schematic illustration of zone interference cancellation through multi-stage adaptive filtering in accordance with one embodiment of the present disclosure.

The ZIC module 1410 involves multiple stages of adaptive filtering. Each stage of adaptive filtering may be carried out using, for example, least mean squares (LMS), normalized least mean squares (NLMS), recursive least squares (RLS) or fast affine projection (FAP) algorithms. FIG. 6 is a schematic illustration of zone interference cancellation through multi-stage adaptive filtering in accordance with one embodiment of the present disclosure. At a particular frequency bin k, the channel that has the highest SNR and also exceeds the minimum SNR threshold is selected as the reference channel j. The reference channel is then filtered by the adaptive filters and subtracted from the other channels to cancel the interference from the reference channel to all other channels through equations (2) through (5) as follows:

$$\hat{x}_i(k,n) = x_i(k,n) - H_{j,i}^H(k) X_j(k,n) \quad (2)$$

wherein $\hat{x}(k, n)$ is channel i with interference from reference channel j subtracted, $H_{j,i}(k)$ is an array of length L of adaptive filter coefficients, $h_{j,i}(k, l)$, which are adapted so as to minimize the interference from reference channel j to channel i:

$$H_{j,i}(k) = [h_{j,i}(k,0), h_{j,i}(k,1), \ldots h_{j,i}(k,L-1)]^T \quad (3)$$

$X_j(k, n)$ is an array of length L containing the current and previous frame values of the STFT coefficients of channel j in bin k:

$$X_j(k,n) = [x_j(k,n), x_j(k,n-1), \ldots x_j(k,n-L+1)]^T \quad (4)$$

and the adaptive filter coefficients are adapted each frame using NLMS:

$$H_{j,i}(k) = H_{j,i}(k) + \mu_{j,i} \frac{X_j(k, n)\hat{x}_i^*(k, n)}{\|X_j(k, n)\|^2} \quad (5)$$

$\mu_{j,i}$ is a variable step size and is calculated by:

$$\mu_{j,i} = \lambda \frac{\|x_j(k, n) w_{j \to i}(k, n)\|^2}{\|\hat{x}_i(k, n)\|^2} \quad (6)$$

where $\lambda$ is a constant in the range between [0,1].

If j is not the primary channel, after the first stage of filtering, the next channel other than channel j which has the highest SNR is selected as the reference channel and the second stage of filtering is performed. This process terminates when the reference channel is also the primary channel, or the number of filtering stage reaches the maximum number of stages. The maximum number of stages is determined based on an assumption of the maximum number of speakers likely talking at the same time in the acoustic environment.

The zone interference suppression module 1412 further suppresses any residual interference using a recursive Wiener filter defined by equation (7):

$$G_i(k, n) = 1 - \alpha \frac{\sum_{j=0, j \neq i}^{M} \|x_{j(n,k)} w_{j \to i}(n, k)\|^2}{\|\hat{x}_i(k, n)\|^2 G_i(k, n-1)} \quad (7)$$

where $G_i(k,n)$ is an attenuation coefficient in frequency bin k and frame n which is applied to interference-cancelled signal $\hat{x}_i(k,n)$, and $\alpha$ is a tuning factor.

The factor $\alpha$ is used to control an intensity of the suppression. Increasing the factor $\alpha$ may increase the amount of interference being suppressed, however, the output signal may also be distorted. Decreasing the factor $\alpha$ may preserve the signal better, however, some interfering signals may pass through.

The processed microphone signal output from module 1414 for zone i is calculated by:

$$\text{zone}_i(k,n) = \hat{x}_i(k,n) * G_i(k,n) \quad (8)$$

followed by an IFFT and overlap-add method.

The processed microphone signal output from the IFFT module 1414 is sent to an application post processor 1416. The application post processor 1416 receives processed microphone signals and other inputs from the vehicle to provide information, infotainment, entertainment services and control services including but not limited to mapping, navigation, climate control, multimedia services, telephone, data and messaging services. The application post processor 1416 provides, or is coupled to, an ASR engine/system, a wake word detector system and a NLP system, as described herein.

Figure 9:
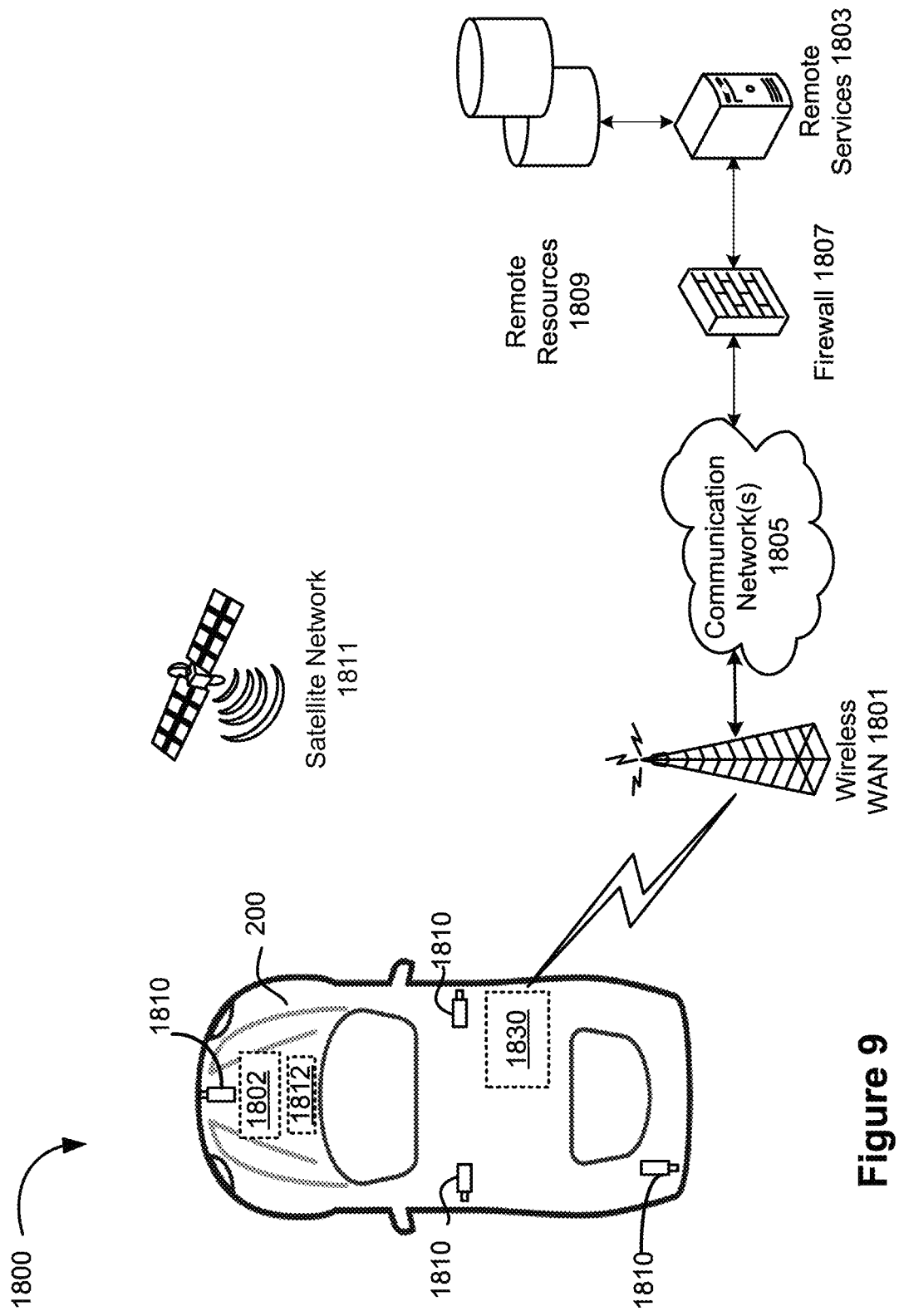
FIG. 9 is a schematic diagram of a communication system suitable for practicing example embodiments of the present disclosure.

The application post processor 1416 may communicate with and interface with cloud-based speech recognition services that are not trained to handle vehicle noise, for example, via the Internet. The speech recognition system 1400 may be used to perform noise reduction in the target zone for cloud-based speech recognition services to suppress road noise or wind noise. Referring briefly to FIG. 9, a communication system 1800 in accordance with one example embodiment of the present disclosure will be disclosed. The communication system 1800 comprises user equipment in the form of a speech recognition system 1802 such as those described above embedded in a vehicle 200. The speech recognition system 1802 may be a vehicular multimedia system. The speech recognition system 1802 in the shown embodiment is coupled to, or incorporated with, a vehicle control system (not shown) that is coupled to a drive control system (not shown) and a mechanical system (not shown) of the vehicle 200. The vehicle control system can in various embodiments allow the vehicle 200 to be operable in one or more of a fully-autonomous, semi-autonomous or fully user-controlled mode. In other embodiments, the vehicle control system may be omitted.

The vehicle 200 includes a plurality of sensors 1810 that collect data about the external environment surrounding the vehicle 200, and a plurality of vehicle sensors 1812 that collect data about the operating conditions of the vehicle 200. The sensors 1810 may include one or more digital cameras, light detection and ranging (LiDAR) units, and radar units such as synthetic aperture radar (SAR) units. The sensors 1810 are located about the vehicle 200 and are each coupled to the vehicle control system. The sensors 1810 may be located at the front, rear, left side and right side of the vehicle 200 to capture data about the environment in front, rear, left side and right side of the vehicle 200. For each type of sensor 1810, individual units are mounted or otherwise located to have different fields of view or coverage areas to capture data about the environment surrounding the vehicle 200, some or all of which may be partially overlapping.

Vehicle sensors 1812 can include an inertial measurement unit (IMU) that senses the vehicle's specific force and angular rate using a combination of accelerometers and gyroscopes, an electronic compass, and other vehicle sensors such as a speedometer, a tachometer, wheel traction sensor, transmission gear sensor, throttle and brake position sensors, and steering angle sensor. The vehicle sensors 1812, when active, repeatedly (e.g., in regular intervals) sense the environment and provide sensor data based on environmental conditions to the vehicle control system in real-time or near real-time. The vehicle control system may collect data about a position and orientation of the vehicle 200 using signals received from a satellite receiver 1832 and the IMU. The vehicle control system may determine a linear speed, angular speed, acceleration, engine RPMs, transmission gear and tire grip of the vehicle 200, among other factors, using data from one or more of the satellite receiver 1832, the IMU, and other vehicle sensors.

The speech recognition system 1802 is coupled to one or more wireless transceivers 1830 that enable the speech recognition system 1802 to exchange data and optionally voice communications with a wireless wide area network (WAN) 1801 of the communication system 1800. The speech recognition system 1802 may use the wireless WAN 1801 to access remote services/servers 1803, such as cloud-based speech recognition services, via one or more communications networks 1805, such as the Internet. The remote services 1803 may be implemented as one or more server modules in a data center and is typically located behind a firewall 1807. The remote services 1803 may be connected to resources 1809, such as supplemental data sources that may be used by the speech recognition system 1802 or vehicle control system.

The speech recognition system 1802 is also coupled to a satellite network 1811 comprising a plurality of satellites. The speech recognition system 1802 and/or vehicle control system may use signals received by the satellite receiver 1832 from the plurality of satellites in the satellite network 1811 to determine its position.

Figure 10:
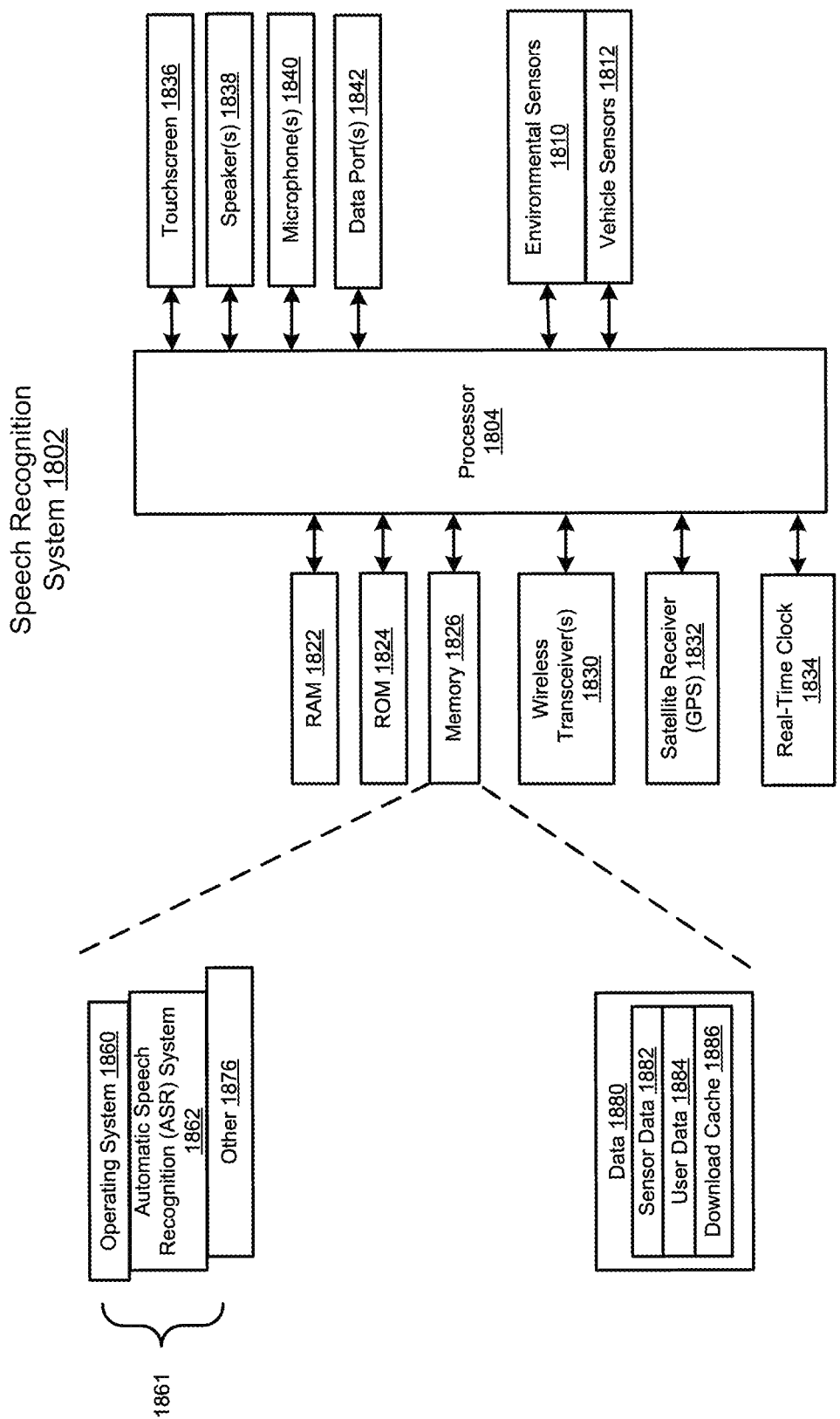
FIG. 10 is a block diagram of a speech recognition system in accordance with one example embodiment of the present disclosure.

FIG. 10 illustrates selected components of the speech recognition system 1802 in accordance with an example embodiment of the present disclosure. The speech recognition system 1802 includes a processor 1804 that is coupled to a plurality of components via a communication bus (not shown) which provides a communication path between the components and the processor 1804. The processor 1804 is coupled to a drive control system, Random Access Memory (RAM) 1822, Read Only Memory (ROM) 1824, persistent (non-volatile) memory 1826 such as flash erasable programmable read only memory (EPROM) (flash memory), one or more wireless transceivers 1830 for exchanging radio frequency signals with the wireless WAN 1810, a satellite receiver 1832 for receiving satellite signals from the satellite network 1811, a real-time clock 1834, and a touchscreen 1836. The processor 1804 may include one or more processing units, including for example one or more central processing units (CPUs), one or more graphical processing units (GPUs) and other processing units.

The wireless transceivers 1830 may comprise one or more cellular (RF) transceivers for communicating with a plurality of different radio access networks (e.g., cellular networks) using different wireless data communication protocols and standards. The speech recognition system 1802 may communicate with any one of a plurality of fixed transceiver base stations (one of which is shown in FIG. 9) of the wireless WAN 1801 (e.g., cellular network) within its geographic coverage area. The one or more wireless transceiver(s) 130 may send and receive signals over the wireless WAN 1801. The one or more wireless transceivers 1830 may comprise a multi-band cellular transceiver that supports multiple radio frequency bands.

The one or more wireless transceivers 130 may also comprise a wireless local area network (WLAN) transceiver for communicating with a WLAN (not shown) via a WLAN access point (AP). The WLAN may comprise a Wi-Fi wireless network which conforms to IEEE 802.11x standards (sometimes referred to as Wi-Fi®) or other communication protocol.

The one or more wireless transceivers 1830 may also comprise a short-range wireless transceiver, such as a Bluetooth® transceiver, for communicating with a mobile computing device, such as a smartphone or tablet. The one or more wireless transceivers 1830 may also comprise other short-range wireless transceivers including but not limited to Near field communication (NFC), IEEE 802.15.3a (also referred to as UltraWideband (UWB)), Z-Wave, ZigBee, ANT/ANT+ or infrared (e.g., Infrared Data Association (IrDA) communication).

The real-time clock 1834 may comprise a crystal oscillator that provides accurate real-time time data. The time data may be periodically adjusted based on time data received through satellite receiver 1832 or based on time data received from network resources 250 executing a network time protocol.

The touchscreen 1836 comprises a display such as a color liquid crystal display (LCD), light-emitting diode (LED) display or active-matrix organic light-emitting diode (AMOLED) display, with a touch-sensitive input surface or overlay connected to an electronic controller. Additional input devices (not shown) coupled to the processor 1804 may also be provided including buttons, switches and dials.

The speech recognition system 1802 also includes one or more speakers 1838, one or more microphones 1840 and one or more data ports 1842 such as serial data ports (e.g., Universal Serial Bus (USB) data ports). The speech recognition 1802 may also include other sensors such as tire pressure sensors (TPSs), door contact switches, light sensors, proximity sensors, etc.

A graphical user interface (GUI) of the speech recognition system 1802 is rendered and displayed on the touchscreen 1836 by the processor 1804. A user may interact with the GUI using the touchscreen 1836 and optionally other input devices (e.g., buttons, dials) to select a driving mode for the vehicle 200 (e.g., fully autonomous driving mode or semi-autonomous driving mode) and to display relevant data and/or information, such as navigation information, driving information, parking information, media player information, climate control information, etc. The GUI may comprise a series of traversable content-specific menus.

The memory 1826 of the speech recognition system 1802 has stored thereon a plurality of software systems 1861 in addition to the GUI, each software system 1861 including instructions that may be executed by the processor 1804. The software systems 1861 include an operating system 1860 and automatic speech recognition (ASR) software system 1862. Other modules 1876 include for example mapping module, navigation module, climate control module, media player module, telephone module and messaging module.

The memory 1826 also stores a variety of data 1880. The data 1880 may comprise sensor data 1882, user data 1884 comprising user preferences, settings and optionally personal media files (e.g., music, videos, directions, etc.), and a download cache 1886 comprising data downloaded via the wireless transceivers 1830 including, for example, data downloaded from network resources 1809. The download cache 1886 may be deleted periodically, for example, after a predetermined amount of time. System software, software modules, specific device applications, or parts thereof, may be temporarily loaded into a volatile store, such as RAM 1822, which is used for storing runtime data variables and other types of data and/or information. Data received by the speech recognition system 1802 may also be stored in the RAM 1822. Although specific functions are described for various types of memory, this is merely one example, and a different assignment of functions to types of memory may also be used.

The vehicle control system comprise may comprise a driving assistance system for semi-autonomous driving, autonomous driving system for fully autonomous driving, and a computer vision system. Both the driving assistance system and the autonomous driving system can include one or more of a navigation planning and control module, a vehicle localization module, parking assistance module, and autonomous parking module. The vehicle control system is coupled to the drive control system and the mechanical system. The drive control system serves to control movement of the vehicle 200. The mechanical system 190 receives control signals from the drive control system to operate the mechanical components of the vehicle 200. The mechanical system effects physical operation of the vehicle 200.

Figure 11:
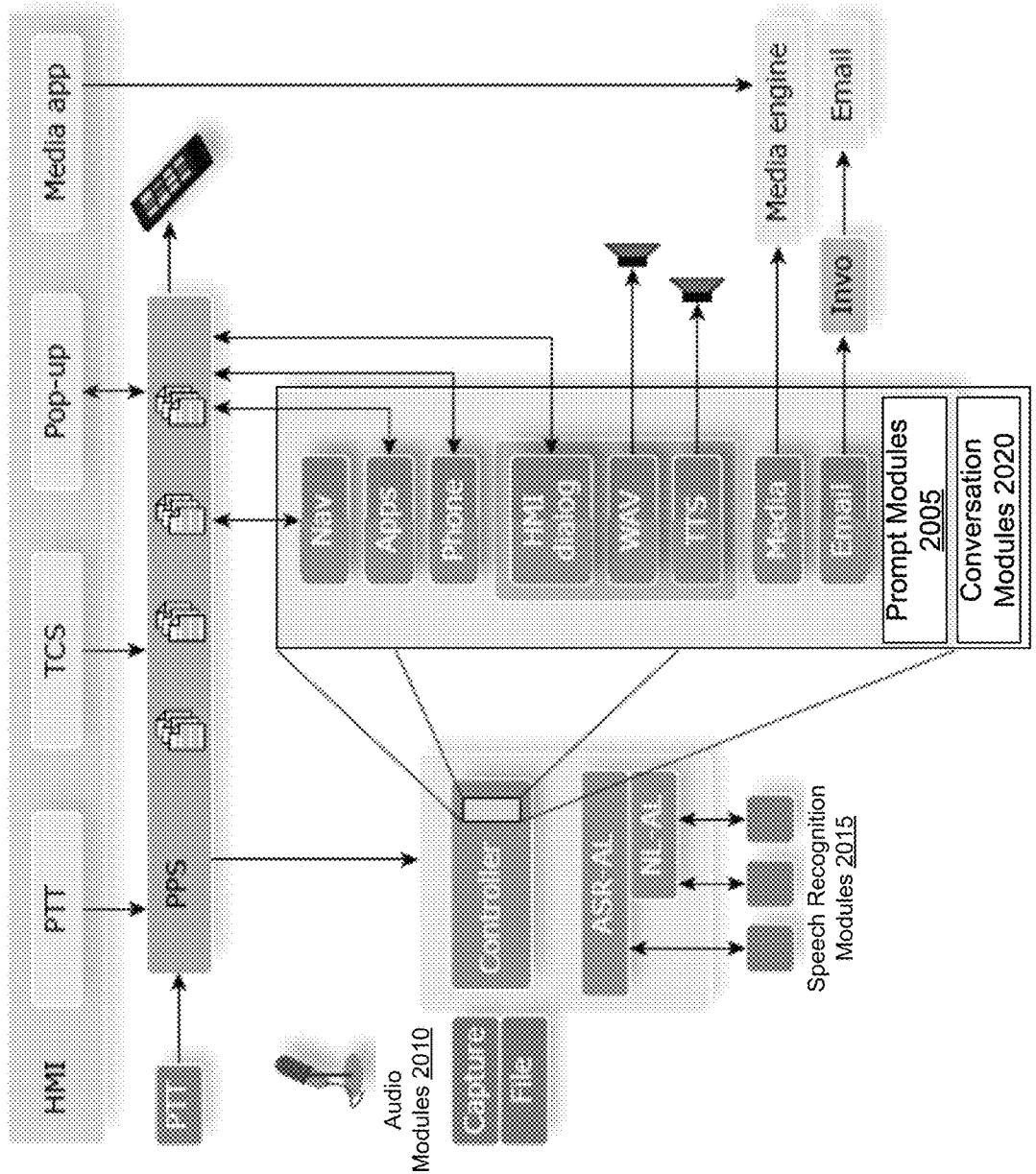
FIG. 11 is a block diagram of an automatic speech recognition system architecture in accordance with one embodiment of the present disclosure.

Referring briefly to FIG. 11, an ASR system 2000 that can comprise the digital application post processor 1416 in accordance with one embodiment of the present disclosure will be described. The ASR system 2000 provides speech recognition services to other components, such as an in-communication system and/or vehicle control system. The ASR system 2000 uses various modules to manage human-machine interactions, including, prompt modules 2005 that manage machine-to-human interactions, which can be either visual (onscreen) or audible, audio modules 2010 that receive captured audio, speech recognition modules 2015 that provide a speech-to-text engine allowing ASR services to be substituted transparently, and conversation modules 2020 that define how to handle human-to-machine speech commands.

The ASR system 200 uses application-specific conversation modules 2020 to provide speech/prompting handling. Conversation modules 2020 are decoupled from the speech recognition modules 2015 so the same conversation modules will work for multiple ASR module vendors. This architecture allows functionality, including adaptations for downloadable applications, to be easily added or removed from the ASR system 2000.

The ASR modules are pluggable modules and allow the ASR system 2000 to add or remove conversation modules to modify the speech flow, adjust the prompt module to change how the user receives responses, change the recognition module to switch speech-to-text services, and specify different audio modules to capture audio from different sources.

The ASR system 2000 uses various modules to perform tasks such as audio capture and import and to provide prompt services. ASR services may be launched through a Persistent Publish/Subscribe (PPS) service when the user activates Push-to-Talk (PPT) functionally, for examples, by touching and activating a PTT button or tab on a human-machine interface (HMI) interface displayed on the touchscreen 1836.

The audio module 2010 include an audio capture module that detects speech commands, including the beginning and end of sentences, and forwards the audio stream to the speech recognition modules 2015.

The speech recognition modules 2015 convert a spoken command (utterance) to text by interpreting captured (and processed) microphone audio signals to deduce words and sentences. The speech recognition modules 2015 collect the audio sample, pass the audio sample to a recognizer for processing, and convert vendor-specific result data (dictation) to the format required by the ASR system 2000. The ASR service passes the result to a Natural Language Adaptation Layer (NLAL). The NLAL uses grammar provided by the conversation modules 2020 to produce intent information, which it adds to the data in the original result structure. For example, the speech recognition module 2015 would take the utterance "search media for Hero" and create a results structure with the dictation as follows:
Result Type: Dictation
Utterance: "search media for Hero"
start-rule: search#media-search
confidence: 600
From this dictation, the NLAL would add intent information to the structure:
Result Type: Intent
Utterance: "search media for Hero"
Start-rule: search-media
Confidence: 600
Intent entries: 2
Field: search-type, value: media
Field: search-term, value: "Hero"

The confidence values mentioned above, in some examples, are a value from 0 to 1000 (0 means no confidence; 1000 means complete confidence).

The conversation modules 2020 are responsible for determining the domain (e.g., navigation, phone, etc.), determining whether the conversation is complete or whether another recognition pass is required, and creating and/or modifying PPS objects as required. Applications such as Media Player and Navigation may subscribe to PPS objects for changes. For example, if the user activates PTT and says "play Arcade Fire", the speech recognition modules 2015 parse the speech command. The Media conversation module 2020 then activates the media engine, causing tracks from the desired artist to play.

The conversation modules 2020 use the intent fields to understand the meaning of an utterance. Some recognition modules can produce intent results directly, bypassing the NLAL. The intents that are extracted by the NLAL are predicated by a grammar that must be provided with the conversation module 2020. The conversation modules are independent of each other. In the described embodiment, the conversation modules 2020 comprises a search conversation module, media conversation module (e.g., car media), and dialer conversation modules (for the telephone application) with support for third-party conversation modules. Third parties implementing ASR can add additional conversation modules to extend ASR capabilities (e.g., calendar). The search conversation module is used by other modules to handle search-related commands. For example, the navigation subsystem uses this module to process instructions to navigate to a destination or search for a point of interest. The search conversation module provides the capabilities for various conversation modules, including application launching, navigation, Internet and local media search, and weather queries. The media conversation module processes speech commands for performing media playback actions. To support these commands, the ASR system 2000 may uses different back-end plugins in the different HMI versions, such as an HTML5 and Qt5 HMI. The dialer conversation module process voice-dialing commands.

The prompt modules 2005 are used primarily by conversation modules 2029. The prompt modules provide audio and/or visual prompt services. Specifically, the prompt modules 2005 provide notification of non-speech responses to onscreen notifications (e.g., selecting an option or canceling a command). The prompts may be sourced from prerecorded audio files (e.g., WAV files) or from Text-To-Speech (TTS).

The ASR and TTS integration The ASR and TTS components, libraries, and configuration files manage ASR conversations, enable modules to communicate with each other, and allow control of various component settings. The ASR modules are linked to a particular service variant, depending on the ASR technology used to perform the speech recognition.

Figure 12:
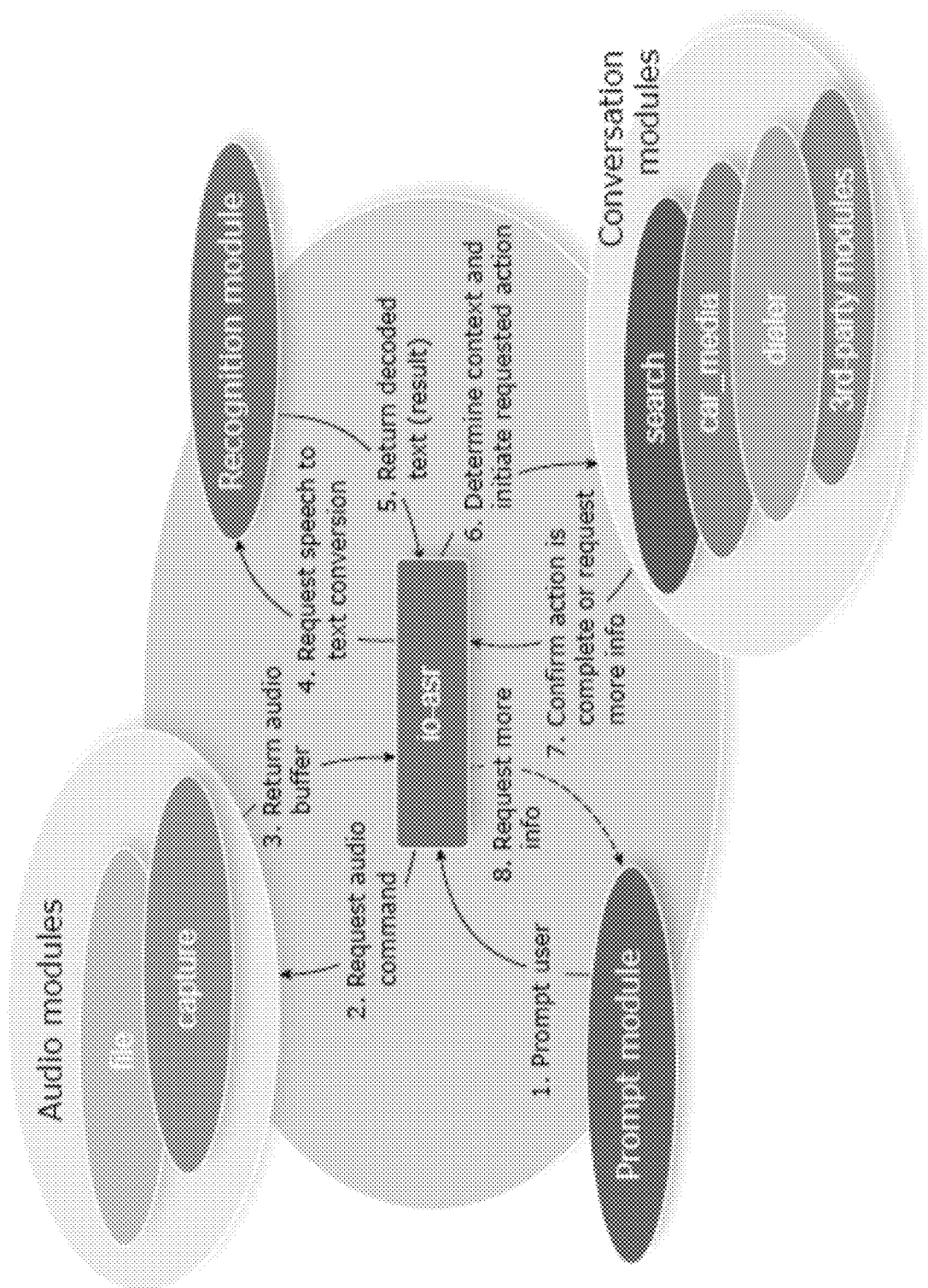
FIG. 12 is a block diagram of a typical automatic speech recognition sequence to manage speech commands in accordance with one embodiment of the present disclosure.

FIG. 12 is a block diagram of a typical automatic speech recognition sequence to manage speech commands in accordance with one embodiment of the present disclosure. Firstly, a prompt module 2005 prompts the user. Next, captured audio is requested from the audio modules 2010, which then return the captured audio to an audio buffer. Next, the audio is sent to the speech recognition modules 2015 for speech-to-text conversion. The result is returned to the ASR services as decoded text. The ASR service determines context and initiates a requested action via the conversation modules 2020. The conversation modules 200 request that the ASR service determine whether the action is complete, and if not, request more information from the user, via prompts generated by the prompt modules 2005, the actions repeating until the action is complete.

Figure 13:
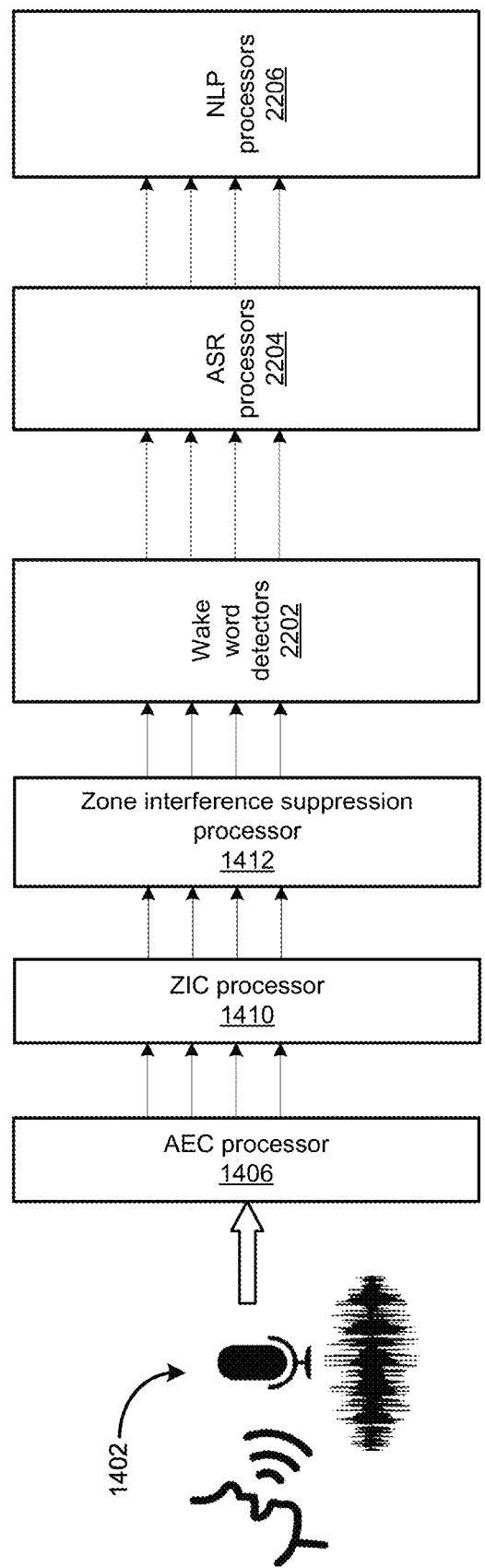
FIG. 13 is a block diagram of a speech processing framework in accordance with one embodiment of the present disclosure.

FIG. 13 illustrates a speech processing framework in accordance with one embodiment of the present disclosure. Speech from an occupant is picked-up/received by microphones 1402 of the multi-zone speech recognition front-end 1400. The received microphone signals are processed by the AEC, ZIC and zone interference suppression processors/modules 1406, 1410 and 1412 of the multi-zone speech recognition front-end 1400. The processed microphone signals are passed to one or more wake word detectors 2202, depending on the embodiment. The wake word detectors 2202 may be part of the multi-zone speech recognition front-end 1400, for example, the wake word detectors 2202 can be part of the application post processor 1416, part of a separate ASR system, or separate from both. For example, the wake word detectors 2202 can comprise a separately controllable part of the ASR system that can comprise the application post processor 1416. The wake word detectors 2202 detect the utterance of a wake word. The output of the wake word detectors 2202 are used to select an active/default audio channel corresponding to one of the microphones 1402, for example, by the application post processor 1416 based on audio channel on which the wake word was detected. The processed microphone signal of the active zone is passed to one or more ASR processors 2204 of the ASR system that can comprise the application post processor 1416, along with the active zone information and active/default audio channel information with can use the active zone information and active/default audio channel information. Speech recognition information is passed from the ASR processors 2204 to one or more NLP processors 2206 that can comprise the application post processor 1416 or separate NLP processors, along with the active zone information and active/default audio channel information with can use the active zone information and active/default audio channel information.

Figure 7:
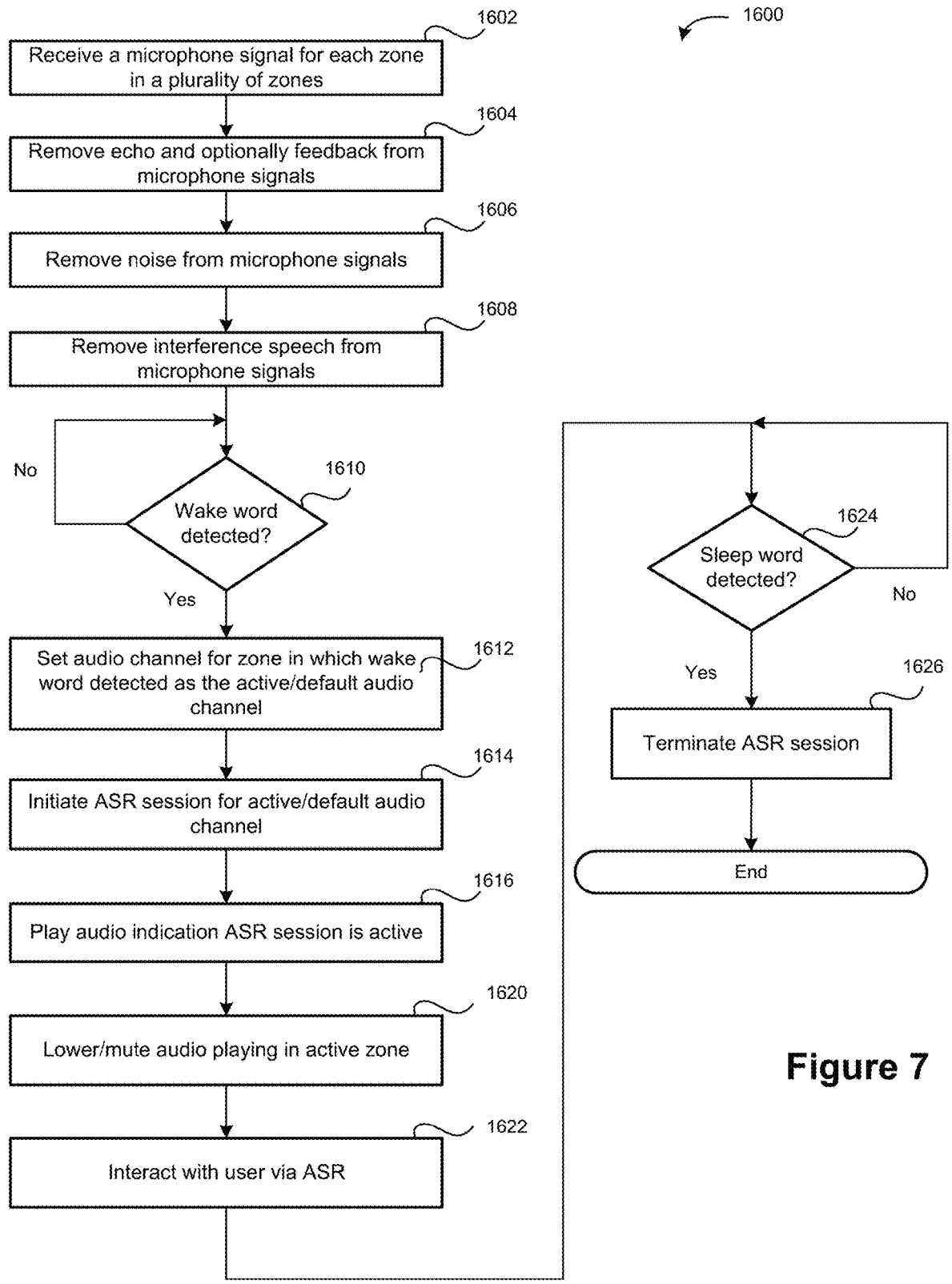
FIG. 7 is a flowchart of a method of multi-zone speech recognition with interference and echo cancellation in accordance with one example embodiment of the present disclosure.

Referring now to FIG. 7, a method 1600 of multi-zone speech recognition with interference and echo cancellation in accordance with one example embodiment of the present disclosure will be described. The method 1600 may be applied to any acoustic environment, which may comprise a vehicle cabin, room, or the like. For purposes of illustration, an example in which the acoustic environment is a vehicle cabin of a vehicle is described. The acoustic environment consists of a number of zones. Each zone of the acoustic environment is provided with one or more microphones and one or more speakers. Each zone may correspond to a seat in the vehicle. The processed microphone signal for each zone is associated with a respective wake word detector which performs speech recognition on the processed microphone signal to identify one or more predetermined keywords. The one or more predetermined keywords that the wake word detector monitors for and detects depends on the particular speech recognition/speech command protocol employed, which may vary between embodiments.

The output signals of the microphones 1402 are continuously processed through the front-end system 1400, which process the microphone output signals so that the processed microphone signals from the front-end system 1400 are substantially free of echo from audio sources, noise and interference speech from outside the respective zone even though audio (e.g., media) may be playing via speakers in the acoustic environment (e.g., vehicle speakers) and multiple talkers may be present in the acoustic environment. A wake word detector operates on each processed microphone signal. The audio modules of the ASR system allow for the selection of an audio channel for a given zone. This allows multiple wake word detectors to operate simultaneously, one for each zone.

At operation 1602, a microphone signal is received for each zone in a plurality of zones of an acoustic environment (e.g., vehicle cabin). If more than one microphone is provided per zone, the microphone signals for each are combined, for example, via beamforming. The received microphone signals are processed by the speech recognition system 1400. The microphone signal for each zone is provided via a dedicated audio channel as described above.

At operation 1604, the received microphone signals are processed by the AEC module 1406 to remove echo and optionally feedback from audio sources within the acoustic environment, i.e., echo and feedback cause by audio transducers in the acoustic environment.

At operation 1606, the received microphone signals are optionally processed by the channel analysis and acoustic modelling module 1408 to estimate speech activity and model acoustic transfer functions between microphones for different talkers in the vehicle.

At operation 1608, the received microphone signals are processed by the ZIC modules 1410 and/or zone interference suppression module 1412 to remove and/or suppress interference speech.

At operation 1610, the keyword spotting is performed by wake word detectors on the processed microphone signal for each zone to monitor for and detect a wake word to initiate an ASR session via the ASR system in a respective zone. The wake word is a predetermined word or phrase, such as "Wakeup BlackBerry".

At operation 1612, in response to detection of the wake word in the processed microphone signal of a zone of a first occupant (e.g., driver) in the plurality of zones of the acoustic environment, the audio channel on which the wake word was detected is set as the active/default audio channel. For example, if the driver speaks the wake word, the wake word detector for the microphone signal of the driver's zone detects the keyword to initiate the ASR session, and the ASR session is initiated by the ASR system. The wake word detectors in the zones of other occupants (e.g., passengers) do not detect the keyword spoken by the driver because the speech of the driver is cancelled from the microphone signals of all other zones, as described above.

The active/default audio channel may be set by the wake word detector of the zone of the first occupant in which the wake word was detected or another component of the ASR system. When a wake word detector detects the wake word on a given audio channel and the audio channel for the zone of the first occupant in which the wake word was detected is set as the active default audio channel, any acquisition of audio (e.g., via audio buffers) by speech recognition modules 2015 that select a specific channel will receive audio only from the default audio channel selected by the wake word detector. This allows speech recognizers to operate in a multi-zone acoustic environment without requiring code changes. The wake word detector of the other zones may be deactivated during the ASR session with the first occupant.

At operation 1614, in response to detection of the wake word in the processed microphone signal of the zone of the first occupant (e.g., driver) in the plurality of zones of the acoustic environment, the ASR session is initiated for the zone of the first occupant in which the wake word was determined only. Speech recognition is not performed for any of other zones. In this way, the ASR system provides speech recognition working with zone isolation.

During the ASR session, the microphone signal of the first occupant's zone continues to be processed using the front-end system 1400 so that echo, noise and interference speech from other occupants (e.g., passengers) are cancelled/suppressed (e.g., operations 1602-1608 are repeated for each audio sample). The processing of microphones signals in other zones may be deactivated during the ASR session with the first occupant, in which case operations 1602-1608 are repeated for each audio sample from the active zone only.

The zone information identifies the zone of the first occupant in which the wake word was detected and the active/default audio channel is communicated to the ASR system so that the zone information is available to speech recognition, NLP, audio normalization, and response handling. The communication of the active zone and the active/default audio channel may be performed by the word detector of the zone of the first occupant in which the wake word was detected. The zone information about which zone is being speech recognized (e.g., the active zone information) and the active/default audio channel is persisted by the speech framework of the ASR system throughout the ASR session. The speech framework provides the zone information to NLP providers so the zone information can be taken into account when interpreting the ASR transcription. The ASR system propagates the zone information to any successive speech turns in a conversation throughout the ASR session so that audio from the same audio channel is used for speech recognition, and that the zone information is available for recognition, NLP, audio normalization, and response processing. The zone information allows the ASR system to support zone specific use cases such as controlling heating, ventilation, and air conditioning (HVAC), media, or other systems/services for the zone where the request originated. For example, an occupant of the acoustic environment speaks the wake word followed by "I'm cold", the ASR system detects the zone from the occupant spoke the wake word, and performs speech recognition from the audio channel of that zone. The zone information is then used by the NLP processors to generate a result that will increase the temperature in the zone of that occupant.

At operation 1616, an audio indication, such as a predetermined speech prompt or predetermined sound (e.g., chime), may be played via the speakers in the first occupant's zone to indicate an ASR session is active for the first occupant's zone. The audio indication may be played at the start of the ASR session and possibly periodically thereafter. The audio indication may be played out of the speakers of the first occupant's zone but not the speakers in the other zones. The audio played out of the speakers in the first occupant's zone may be ducked (e.g., volume reduced/muted) in addition to or instead of playing predetermined speech prompt or predetermined sound. The localized playback of a prompt or sound and/or the ducking of media playback in the speakers in the first occupant's zone provide audible feedback to the first occupant (e.g., driver) that the first occupant's zone is active. In addition to the audio indication, a visual indication may be provided.

At operation 1620, any audio (e.g., media) in the first occupant's zone may be ducked by decreasing the volume of one or more speakers in the first occupant's zone. Decreasing the volume in first occupant's zone may consist of muting the audio on the speakers in first occupant's zone. The audio in other zones may continue to play via speakers in the other zones while audio in first occupant's zone is ducked (e.g., volume reduced/muted) with the volume in the other zones being either unchanged or a lower volume.

At operation 1622, during the ASR session with the first participant, the ASR system may issue a series of voice prompts, process processed microphone signals from the first occupant's zone to extract words from received speech from the first occupant, process the extracted words, and perform actions/operations in response to the result of processing the extracted words. For example, the SR system may prompt the user "What would you like to do?" In response, the driver may issue a speech command such as "Find me directions to the nearest Starbucks." The SR system may engage a navigation system, determine the location of the nearest Starbucks®, determine the current location of the vehicle, plot directions from the current location to the location of the nearest Starbucks®, and display directions and/or an interactive map on a display of an infotainment system of the vehicle.

The AEC module 1406 may cancel echo of the voice prompts from the ASR system to allow the first participant (e.g., driver) to interrupt the voice prompt before the voice prompt is complete (e.g., "barge-in").

At operation 1620, the ASR system monitors for and detects a sleep word in the processed microphone signal of the zone of the first occupant to terminate the ASR session. The sleep word is a predetermined word or phrase, such as "Bye BlackBerry".

At operation 1624, in response to detection of the sleep phrase to terminate the ASR session in the processed microphone signal of the zone of the first occupant, the ASR session is terminated. When the ASR session has ended, all wake word detectors for the acoustic environment are returned to the initial state in which the wake word detectors are active for all microphones 1402.

In some embodiments, the processing of microphone signals from zones other than the first occupant's zone may be suspended to conserve processing resources while the microphone signal of the first participant's zone is being actively used for speech recognition.

Figure 8:
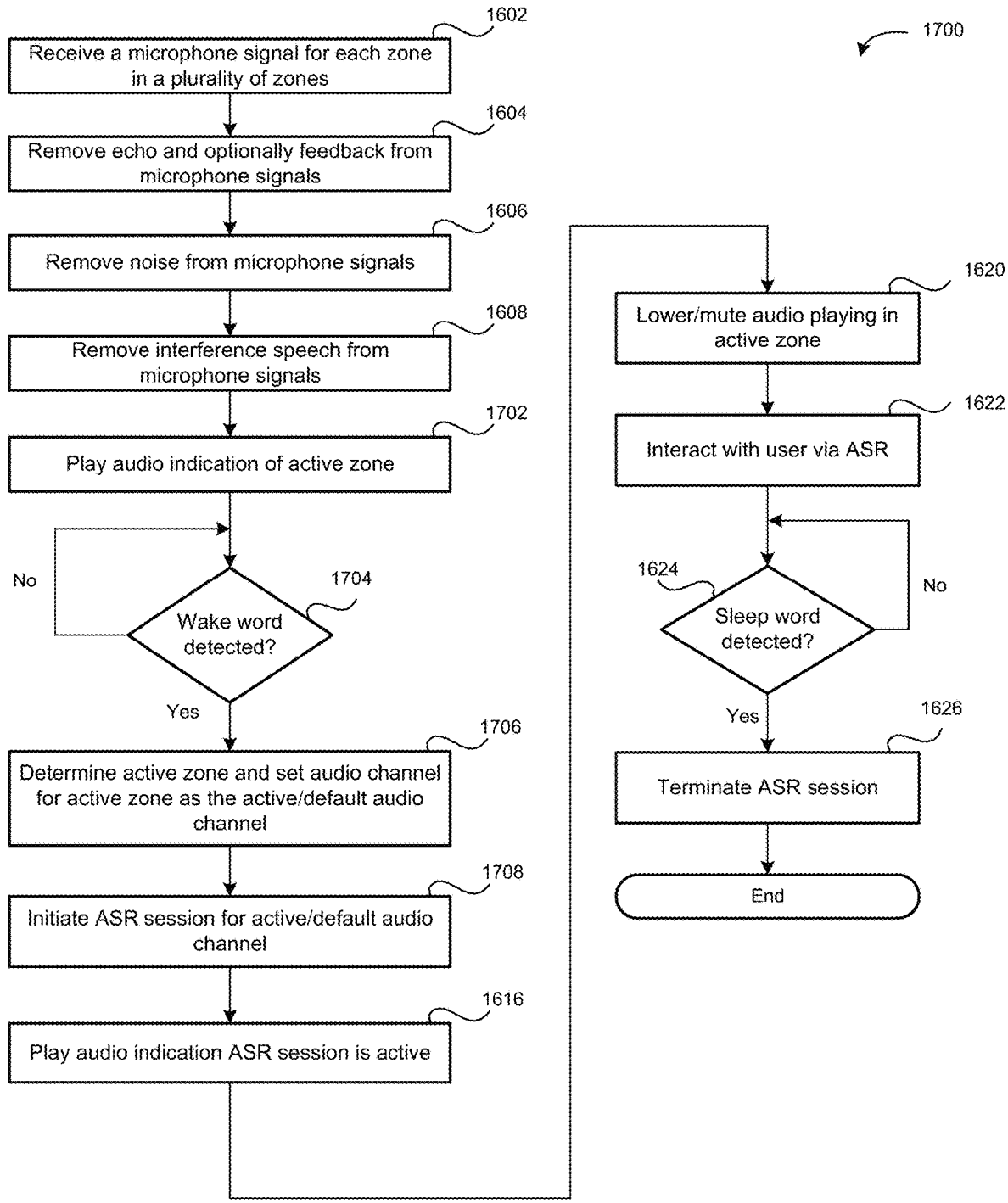
FIG. 8 is a flowchart of a method of multi-zone speech recognition with interference and echo cancellation in accordance with another example embodiment of the present disclosure.

Referring now to FIG. 8, a method 1700 of multi-zone speech recognition with interference and echo cancellation in accordance with one example embodiment of the present disclosure will be described. The method 1700 is similar to the method 1600 except that a single wake word detector is used rather than using a wake word detector for each zone. The method 1700 may be used in cases in which operating a wake word detector per zone is prohibitive in terms of processing power.

Operations 1602 to 1608 are performed as described above.

At operation 1702, an audio indication of which zone is currently active is output periodically by the system 1400 in addition to the processed audio signals. The active zone is the zone which is the most active as determined by a zone activity detector of the multi-zone speech recognition front-end 1400. The system 1400 may perform level comparisons across microphones 1402 or compute speech probabilities to determine the active zone, which may comprise temporal averaging. The zone activity detector may in addition use information such as seat detectors, voice activity detection and signal-to-noise ratios, to determine the most active zone.

At operation 1704, a single wake word detector 2202 runs on a composite of the processed microphone signal for each zone in the plurality of zones of the acoustic environment to monitor for and detect a wake word to initiate an ASR session via the ASR system in a respective zone. The composite of the processed microphone signal may be an average or sum of the processed microphone signals of each zone.

At operation 1706, in response to detection of the wake word, the zone which was most active at the time the wake word was detected is determined to be an active zone, and the audio channel of the active zone is set as the active/default audio channel.

At operation 1708, in response to detection of the wake word, the ASR session is initiated for the active zone.

Operations 1616 to 1626 are then performed, as described above.

The systems and methods of voice control in a multi-talker and multimedia environment allow one or more wake word detectors and an ASR and/or NLP solution to operate effectively in a multiple-talker scenario with background media in a vehicle. A speech recognition session may be initiated from any zone in the vehicle, and in the presence of speech interference and noise interference from the same zone or a different zone. At least one voice/speech/audio channel is provided per zone (e.g., at least one microphone is provided per zone). Each channel/zone can be processed independently. A target zone/target speech can be identified. Zone interference cancellation is performed to cancel/suppress interference speech from a zone while preserving the target speech in that zone. Acoustic echo cancellation is performed on each channel to suppress the echo of audio sources (e.g., media sources) that are picked up in each zone. The systems and methods may interface with cloud-based speech recognition services that are not trained to handle vehicle noise, and noise reduction in the target zone may be performed for such cloud-based speech recognition services to suppress road noise or wind noise.

The systems and methods described above and herein reinforce speech and enhance it without distortion or added noise in a vehicle. A vehicle with the present disclosure may comprise, without limitation, a car, bus, truck, tractor, motorcycle, bicycle, tricycle, quadricycle, or other cycle, ship, submarine, boat or other watercraft, helicopter, drone, airplane or other aircraft, train, tram or other railed vehicle, spaceplane or other spacecraft, and any other type of vehicle. In other words, a vehicle comprises a device or structure for transporting persons or things.

The systems and methods described above and herein are fully automated such that the occupants do not need to operate any controls at all. The system provides active signal enhancements and entertainment in the car and transmitted to local or remote wireless devices or mobile phones. It operates at low delay. The system can be implemented on or within other car systems such as an infotainment processor and digital signal processors or DSPs and co-exist and communicate with other system software. The system is easy and quickly adapted to different vehicle and cabin types and different acoustic environments configurations.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

The processors described herein may comprise a single processor or multiple processors that may be disposed on a single chip, on multiple devices or distributed over more than one system. The processors described herein may be hardware that executes computer executable instructions or computer code embodied in any of the memories described herein or in other memory to perform one or more features of the systems described herein. The processors described herein may comprise any programmable system using microprocessors/controllers or nanoprocessors/controllers, and may include a central processing unit (CPU), a graphics processing unit (GPU), an application specific integrated circuit (ASIC), a digital signal processor (DSP), a field programmable gate array (FPGA), a reduced instruction set circuits (RISC), a digital circuit, an analog circuit, a logic circuit, a microcontroller, any other type of processor or circuit capable of executing the functions described herein, or any combination thereof. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The memory described herein or storage disclosed may retain an ordered listing of executable instructions for implementing the functions described above. The machine-readable medium may selectively be, but not limited to, an electronic, a magnetic, an optical, an electromagnetic, an infrared, or a semiconductor medium. A non-exhaustive list of examples of a machine-readable medium includes: a portable magnetic or optical disk, a volatile memory, such as a RAM, a ROM, an EPROM or flash memory, or a database management system. The memories described herein may comprise a single device or multiple devices that may be disposed on one or more dedicated memory devices or on a processor or other similar device. When functions or steps are said to be "responsive to" or occur "in response to" a function or a process, the device functions or steps necessarily occur as a result of the function or message. It is not sufficient that a function or act merely follow or occur subsequent to another. Further, when functions indicate an echo cancellation, echo is removed by subtracting an estimated echo from the transmitted or received signal.

The memories described herein may also store computer code, executable by the synthesis processor 312, the echo and feedback cancellation processor 314, the post processor 316, the signal separator processor 702, the application post processor 704, the FFT module 1404, AEC module 1406, channel analysis and acoustic modelling module 1408, ZIC module 1410, zone interference suppression module 1412, IFFT module 1414, application post processor 1416, as described herein. The computer code may include instructions executable with the processors escribed herein. The computer code may be written in any computer language, such as C, C++, assembly language, channel program code, and/or any combination of computer languages. The memories described herein may store information in data structures including, for example, feedback and or echo canceller coefficients that render or estimate echo signal levels.

The functions, acts or tasks illustrated in the Figures or described may be executed in response to one or more sets of logic or instructions stored in or on non-transitory computer readable media as well. The functions, acts or tasks are independent of the particular type of instructions set, storage media, processor or processing strategy and may be performed by software, hardware, integrated circuits, firmware, micro code and the like, operating alone or in combination. In one embodiment, the instructions are stored on a removable media device for reading by local or remote systems. In other embodiments, the logic or instructions are stored in a remote location for transfer through a computer network or over wireless or tangible telephone or communication lines. In yet other embodiments, the logic or instructions may be stored within a given computer such as, for example, a CPU.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A method of voice control in a multi-talker and multimedia environment, comprising:
receiving a microphone signal for each zone in a plurality of zones of an acoustic environment, wherein at least one microphone is located in each zone, wherein the microphone signal from each zone in the plurality of zones is provided by a separate audio channel extending between the at least one microphone located in each zone and an application post processor, wherein one audio channel is provided per zone;
removing, by an acoustic echo cancellation module, echo caused by audio transducers in the acoustic environment from the microphone signal of each audio channel to generate an echo cancelled microphone signal for each audio channel;
removing, by a zone interference cancellation module, interference from the echo cancelled microphone signal of each audio channel to generate a processed microphone signal for each audio channel;
performing speech recognition on the processed microphone signals of each audio channel to generate words from the processed microphone signals;
performing keyword spotting on the words generated from the processed microphone signals of each audio channel; and
in response to detection of a wake word in the words generated from the processed microphone signals of each audio channel:
setting a first zone in the plurality of zones in which the wake word was detected as an active zone;
setting an audio channel of the active zone as an active audio channel;
initiating an automatic speech recognition session for the active audio channel, wherein during the automatic speech recognition session, speech recognition is only performed on the active audio channel, wherein the speech recognition is performed by the application post processor on the processed microphone signal output from the zone interference cancellation module for the active audio channel;
performing natural language processing on results of the speech recognition to determine an action to be performed, wherein both the active zone and the results of speech recognition are used to determine the action to be performed; and
performing the determined action.

2. The method of claim 1, wherein during the automatic speech recognition session, the echo caused by the audio transducers in the acoustic environment from each of the microphone signals is removed from the active audio channel and interference from the microphone signals of other audio channels is removed from the active audio channel.

3. The method of claim 1, further comprising:
during the automatic speech recognition session, providing an audio indication of the active zone.

4. The method of claim 3, wherein the audio indication comprises decreasing a volume of audio output from one or more speakers in the active zone.

5. The method of claim 3, wherein the audio indication comprises outputting a speech prompt or sound from one or more speakers in the active zone.

6. The method of claim 1, further comprising:
in response to detection of a sleep word in the words generated from the processed microphone signal of the first zone in the plurality of zones during the automatic speech recognition session, terminating the automatic speech recognition session for the active audio channel.

7. The method of claim 1, wherein removing interference from each of the microphone signals comprises removing interference speech from speech originating in other zones.

8. The method of claim 7, wherein removing interference speech caused by speech originating in other zones comprises:
using measured signal and noise level differences between the plurality of microphone signals to detect speech of an occupant of a respective zone;
for each zone in which speech of an occupant is detected, using an adaptive filter to estimate a speech contribution of the occupant on the microphone signals in other zones;
for each microphone signal, removing the estimated speech contribution of occupants in other zones.

9. The method of claim 1, wherein removing echo caused by audio transducers in the acoustic environment from each of the microphone signals comprises:
estimating a plurality of echo paths from each of the plurality of audio transducers to each of the plurality of microphones in the acoustic environment, each microphone being located in and associated with a zone in the plurality of zones of the acoustic environment; and
removing echo contributions from each of the plurality of echo paths from the microphone signals.

10. The method of claim 1, wherein a plurality of microphone signals are received for each zone, wherein generating the processed microphone signal comprises combining the microphone signals of each zone into a composite signal using fixed mixing, dynamic mixing, or beamforming.

11. A system for voice control in a multi-talker and multimedia environment, comprising:
a plurality of microphones, each microphone being located in and associated with a zone in a plurality of zones of an acoustic environment;
a plurality of speakers, each speaker being located in and associated with a zone in the plurality of zones of the acoustic environment;
a processor system comprising one or more processors coupled to the plurality of microphones and the plurality of speakers programmed to:
receive a microphone signal for each zone in a plurality of zones of an acoustic environment, wherein at least one microphone is located in each zone, wherein the microphone signal from each zone in the plurality of zones is provided by a separate audio channel extending between the at least one microphone located in each zone and an application post processor, wherein one audio channel is provided per zone;
remove, by an acoustic echo cancellation module, echo caused by audio transducers in the acoustic environment from the microphone signal of each audio channel to generate an echo cancelled microphone signal for each audio channel;
remove, by a zone interference cancellation module, interference from the echo cancelled microphone signal of each audio channel to generate a processed microphone signal for each audio channel;
perform speech recognition on the processed microphone signals of each audio channel to generate words from the processed microphone signals;

perform keyword spotting on the words generated from the processed microphone signals of each audio channel; and in response to detection of a wake word in the words generated from the processed microphone signals of each zone in the plurality of zones:

set a first zone in the plurality of zones in which the wake word was detected as an active zone;

set an audio channel of the active zone as an active audio channel;

initiate an automatic speech recognition session for the active audio channel, wherein during the automatic speech recognition session, speech recognition is only performed on the active audio channel, wherein the speech recognition is performed by the application post processor on the processed microphone signal output from the zone interference cancellation module for the active audio channel;

perform natural language processing on results of the speech recognition to determine an action to be performed, wherein both the active zone and the results of speech recognition are used to determine the action to be performed; and perform the determined action.

12. A non-transitory machine readable medium having tangibly stored thereon executable instructions for execution by a processor, wherein the executable instructions, when executed by the processor of the electronic device, cause the processor to:

receive a microphone signal for each zone in a plurality of zones of an acoustic environment, wherein at least one microphone is located in each zone, wherein the microphone signal from each zone in the plurality of zones is provided by a separate audio channel extending between the at least one microphone located in each zone and an application post processor, wherein one audio channel is provided per zone;

remove, by an acoustic echo cancellation module, echo caused by audio transducers in the acoustic environment from the microphone signal of each audio channel to generate an echo cancelled microphone signal for each audio channel;

remove, by a zone interference cancellation module, interference from the echo cancelled microphone signal of each audio channel to generate a processed microphone signal for each audio channel;

perform speech recognition on the processed microphone signals of each audio channel to generate words from the processed microphone signals;

perform keyword spotting on the words generated from the processed microphone signals of each audio channel; and in response to detection of a wake word in the words generated from the processed microphone signals of each zone in the plurality of zones:

set a first zone in the plurality of zones in which the wake word was detected as an active zone;

set an audio channel of the active zone as an active audio channel;

initiate an automatic speech recognition session for the active audio channel, wherein during the automatic speech recognition session, speech recognition is only performed on the active audio channel, wherein the speech recognition is performed by the application post processor on the processed microphone signal output from the zone interference cancellation module for the active audio channel;

perform natural language processing on results of the speech recognition to determine an action to be performed, wherein both the active zone and the results of speech recognition are used to determine the action to be performed; and perform the determined action.

13. The system of claim 11, wherein the processor system is further programmed to:

during the automatic speech recognition session, provide an audio indication of the active zone.

14. The non-transitory machine readable medium of claim 12, wherein the executable instructions, when executed by the processor of the electronic device, cause the processor to:

during the automatic speech recognition session, provide an audio indication of the active zone.

* * * * *